US012801740B2

(12) United States Patent
Molloy et al.

(10) Patent No.: US 12,801,740 B2
(45) Date of Patent: Nov. 17, 2026

(54) METHOD AND SYSTEM FOR ZERO DAY MALWARE SIMILARITY DETECTION

(71) Applicant: BlackBerry Limited, Waterloo (CA)

(72) Inventors: Christopher James Ryan Molloy, Toronto (CA); Honghui Ding, Montreal (CA)

(73) Assignee: BlackBerry Limited, Waterloo (CA)

( * ) Notice: Subject to any disclaimer, the term of this patent is extended or adjusted under 35 U.S.C. 154(b) by 166 days.

(21) Appl. No.: 18/481,456

(22) Filed: Oct. 5, 2023

(65) Prior Publication Data

US 2025/0117483 A1 Apr. 10, 2025

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC .......................... G06F 2221/034; G06F 21/566
USPC .............................................................. 726/24
See application file for complete search history.

(56) References Cited

U.S. PATENT DOCUMENTS 9,910,986 B1 * 3/2018 Saxe ..................... G06F 21/563
11,288,368 B1 * 3/2022 Wesson ................... G06F 21/64
2016/0057159 A1 * 2/2016 Yin ....................... H04L 63/145 726/23
2017/0262633 A1 * 9/2017 Miserendino .......... G06N 5/025
2018/0041536 A1 2/2018 Berlin
2021/0141897 A1 5/2021 Seifert et al.
2021/0256401 A1 8/2021 Elkind
2022/0046057 A1 * 2/2022 Kutt ....................... G06N 3/045
2023/0342462 A1 * 10/2023 Ducau .................... G06N 3/084
2025/0117483 A1 * 4/2025 Molloy ................. G06F 21/564

FOREIGN PATENT DOCUMENTS

WO WO-2022101909 A1 * 5/2022 ............. G06F 21/53

OTHER PUBLICATIONS

European Patent Office (EPO): Extended European Search Report (EESR) for Application No. 24202346.3, Date: Feb. 19, 2025, 8 pages.
Marpaung et al., "Survey on malware evasion techniques: state of the art and challenges", in 2012 14th International Conference on Advanced Communication Technology (ICACT), 2012, pp. 744-749.
Mercaldo & Santone, "Formal Equivalence Checking for Mobile Malware Detection and Family Classification", IEEE Transactions on Software Engineering vol. 48 No. 7, Jul. 2022, pp. 2643-2657.

(Continued)

*Primary Examiner* — Josnel Jeudy
(74) *Attorney, Agent, or Firm* — Moffat & Co

(57) ABSTRACT

A method at a computing device including fragmenting a malware sample into a plurality of byte strings, each of the plurality of byte strings having a predetermined length; embedding each of the plurality of byte strings in an embedding network to generate a plurality of embeddings; for each embedding in the plurality of embeddings, finding a nearest neighbor; and setting a predicted family for the malware sample based on a fusion of the nearest neighbor for each of the plurality of embeddings.

15 Claims, 9 Drawing Sheets

(56) References Cited

OTHER PUBLICATIONS

Garcia et al., "Lightweight, Obfuscation-Resilient Detection and Family Identification of Android Malware", ACM Transactions on Software Engineering and Methodology vol. 26 No. 3 Article 11, Jan. 2018, 29 pages.
Ucci et al., "Survey of Machine Learning Techniques for Malware Analysis", preprint submitted for Computers & Security vol. 81 Mar. 2019, 2018 (version v3), 55 pages.
Turner et al., "Symantec Internet Security Threat Report: Trends for Jul. 4-Dec. 4", Symantec Internet Security Threat Report vol. VII, Mar. 2005, 96 pages.
Zhu et al., "A Few-Shot Meta-Learning based Siamese Neural Network using Entropy Features for Ransomware Classification", preprint submitted to Computers & Security vol. 117, 2022 (version v2), 29 pages.
Chen et al., "Similarity-Based Malware Classification Using Graph Neural Networks", Applied Sciences vol. 12 10837, 2022, 17 pages.
Huang et al., "ISMCS: An Intelligent Instruction Sequence Based Malware Categorization System", in 2009 3rd International Conference on Anti-counterfeiting, Security, and Identification in Communication, 2009, 4 pages.
Park et al., "Fast Malware Classification by Automated Behavioral Graph Matching", in Proceedings of the Sixth Cyber Security and Information Intelligence Research Workshop (CSIIRW '10), 2010, 4 pages.
Dahl et al., "Large-Scale Malware Classification Using Random Projections and Neural Networks", 2013 IEEE International Conference on Acoustics, Speech and Signal Processing, 2013, 5 pages.
Ye et al., "Automatic Malware Categorization Using Cluster Ensemble", in Proceedings of the 16th ACM SIGKDD International Conference on Knowledge Discovery and Data Mining (KDD '10), 2010, 10 pages.
Molloy et al., "Adversarial Variational Modality Reconstruction and Regularization for Zero-Day Malware Variants Similarity Detection", in 2022 IEEE International Conference on Data Mining (ICDM), 2022, 6 pages.
Hsiao et al., "Malware Image Classification Using One-Shot Learning with Siamese Networks", 23rd International Conference on Knowledge-Based and Intelligent Information & Engineering Systems, Procedia Computer Science vol. 159, 2019, pp. 1863-1871.
Conti et al., "A few-shot malware classification approach for unknown family recognition using malware feature visualization", Computers & Security vol. 122 102887, 2022, 16 pages.
Molloy et al., "H4rm0ny: A Competitive Zero-Sum Two-Player Markov Game for Multi-Agent Learning on Evasive Malware Generation and Detection", in 2022 IEEE International Conference on Cyber Security and Resilience (CSR), 2022, 8 pages.
Suciu et al., "Exploring Adversarial Examples in Malware Detection", in 2019 IEEE Security and Privacy Workshops (SPW), 2019, pp. 8 to 14.
Malkov & Yashunin, "Efficient and robust approximate nearest neighbor search using Hierarchical Navigable Small World graphs", preprint submitted to IEEE Transactions on Pattern Analysis and Machine Intelligence vol. 42 Issue 4, 2020, 13 pages.
Mehrotra et al., "Modeling Functional Similarity in Source Code with Graph-Based Siamese Networks", IEEE Transactions on Software Engineering vol. 48 Issue 10, 2022, 21 pages.
Schroff et al., "FaceNet: A Unified Embedding for Face Recognition and Clustering", in Proceedings of the IEEE Conference on Computer Vision and Pattern Recognition (CVPR), 2015, pp. 815-823.
Raff et al., "Malware Detection by Eating a Whole EXE", in The Workshops of the Thirty-Second AAAI Conference on Artificial Intelligence, 2018, pp. 268-276.
Kingma & Ba, "Adam: A Method for Stochastic Optimization", published as a conference paper at ICLR 2015, 2017 (version v9), 15 pages.
Moon, "The Expectation-Maximization Algorithm", IEEE Signal Processing Magazine vol. 13 Issue 6, Nov. 1996, pp. 47-60.
Kleinberg, "Navigation in a small world", Nature vol. 406, Aug. 24, 2000, p. 845.
Boguñá et al., "Navigability of complex networks", Nature Physics vol. 5, Jan. 2009, pp. 74-80.
Malkov et al., "Approximate nearest neighbor algorithm based on navigable small world graphs", Information Systems 45, 2014, pp. 61-68.
Tharwat, "Linear vs. quadratic discriminant analysis classifier: a tutorial", Int. J. Applied Pattern Recognition vol. 3 No. 2, 2016, pp. 145-180.
Freund & Schapire, "A Decision-Theoretic Generalization of On-Line Learning and an Application to Boosting", Journal of Computer and System Sciences vol. 55 Article No. SS971504, 1997, pp. 119-139.
Steinberg, "Chapter 10: CART: Classification and Regression Trees", The Top Ten Algorithms in Data Mining, 2009, pp. 179-201.
Breiman, "Random Forests", Machine Learning vol. 45, 2001, pp. 5-32.
Krčál et al., "Deep Convolutional Malware Classifiers can Learn from Raw Executables and Labels Only", workshop track—ICLR 2018, 2018, 4 pages.
Wu et al., "Why an Android App is Classified as Malware: Toward Malware Classification Interpretation", ACM Transactions on Software Engineering and Methodology vol. 30 No. 2 Article 21, Mar. 2021, 29 pages.
Zhao et al., "On the Impact of Sample Duplication in Machine-Learning-Based Android Malware Detection", ACM Transactions on Software Engineering and Methodology vol. 30 No. 3 Article 40, May 2021, 38 pages.
Zou et al., "IntDroid: Android Malware Detection Based on API Intimacy Analysis", ACM Transactions on Software Engineering and Methodology vol. 30 No. 3 Article 39, May 2021, 32 pages.
Cai, "Assessing and Improving Malware Detection Sustainability through App Evolution Studies", ACM Transactions on Software Engineering and Methodology vol. 29 No. 2 Article 8, Mar. 2020, 28 pages.
Gibert et al., "The rise of machine learning for detection and classification of malware: Research developments, trends and challenges", Journal of Network and Computer Applications vol. 153 102526, 2020, 22 pages.
Koch et al., "Siamese Neural Networks for One-shot Image Recognition", Proceedings of the 32nd International Conference on Machine Learning, JMLR: W&CP vol. 37, 2015, 8 pages.
Bromley et al., "Signature Verification using a "Siamese" Time Delay Neural Network", in Advances in Neural Information Processing Systems 6 (NIPS 1993), 1994, pp. 737-744.
Demirezen, "Image Based Malware Classification with Multimodal Deep Learning", International Journal of Information Security Science vol. 10 No. 2, 2021, pp. 42-59.

* cited by examiner

METHOD AND SYSTEM FOR ZERO DAY MALWARE SIMILARITY DETECTION

FIELD OF THE DISCLOSURE

The present disclosure relates to malware similarity detection, and in particular relates to unknown (zero-day) family detection.

BACKGROUND

With rapid advances in Artificial Intelligence (AI) and Deep Learning (DL) in recent years, learned systems are being applied to aid humans in all aspects of life. Areas that require large amounts of data processing have seen greater success with applications of AI. One such application is cybersecurity.

One area of cybersecurity is malware analysis. Malware is malicious code that may intend to cause harm to a computer system, for example by corrupting functions on a computer or operating system of the computer, or by stealing sensitive data from the computer system. Malware analysis is a process of determining the functionality, origin, and/or potential impact of a malware sample.

In the cybersecurity task of malware analysis, governments and corporations must search through millions of files entering their network each year for malware. According to the AVTEST Institute, there were 70,687,826 new unique malware samples cataloged for Windows systems alone in 2022. Human investigation is impossible at this scale, and traditional signature-based methods can be evaded through packing and other obfuscation techniques.

The task of malware analysis is not simply finding if a file has malicious intent or not. Challenges within the space of malware analysis are family detection, similarity analysis, and zero-day family detection.

BRIEF DESCRIPTION OF THE DRAWINGS

The present disclosure will be better understood with reference to the drawings, in which.

DETAILED DESCRIPTION OF THE DRAWINGS

Figure 1:
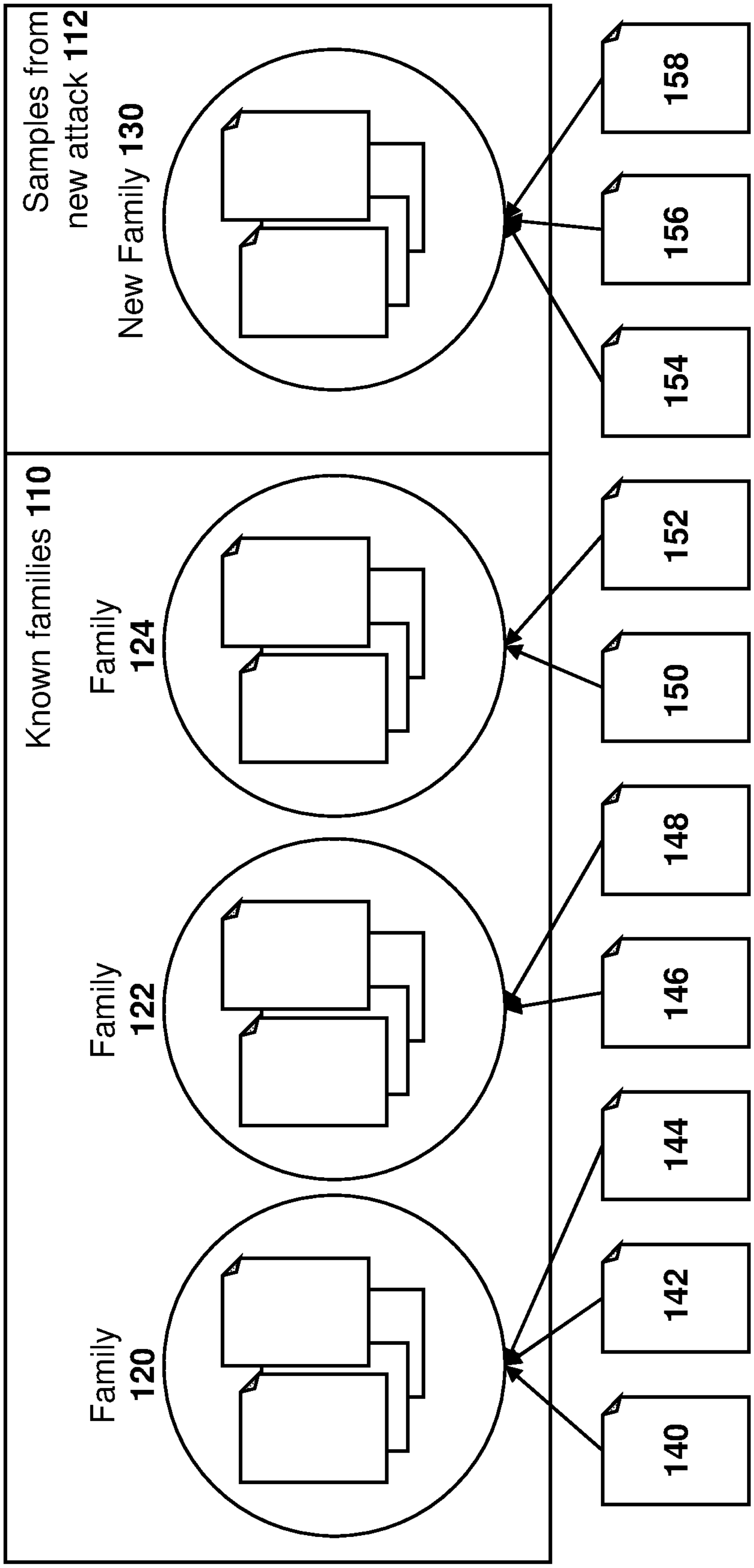
FIG. 1 is a block diagram showing the sorting of malware samples into families and classifying unknown samples as a new family.

The present disclosure provides a method at a computing device comprising: fragmenting a malware sample into a plurality of byte strings, each of the plurality of byte strings having a predetermined length; embedding each of the plurality of byte strings in an embedding network to generate a plurality of embeddings; for each embedding in the plurality of embeddings, finding a nearest neighbor; and setting a predicted family for the malware sample based on a fusion of the nearest neighbor for each of the plurality of embeddings.

The present disclosure further provides a computing device comprising: a processor; and memory, wherein the computing device is configured to: fragment a malware sample into a plurality of byte strings, each of the plurality of byte strings having a predetermined length; embed each of the plurality of byte strings in an embedding network to generate a plurality of embeddings; for each embedding in the plurality of embeddings, find a nearest neighbor; and set a predicted family for the malware sample based on a fusion of the nearest neighbor for each of the plurality of embeddings.

The present disclosure further provides a computer readable medium for storing instruction code, which, when executed by a processor of a computing device, cause the computing device to: fragment a malware sample into a plurality of byte strings, each of the plurality of byte strings having a predetermined length; embed each of the plurality of byte strings in an embedding network to generate a plurality of embeddings; for each embedding in the plurality of embeddings, find a nearest neighbor; and set a predicted family for the malware sample based on a fusion of the nearest neighbor for each of the plurality of embeddings.

Due to the constantly evolving landscape of attack methods, and the vast amount of new malware each day, it is impossible for humans to detect and categorize malware on their own.

With recent advancements in artificial intelligence and machine learning (ML), learned algorithms have been proposed for solving problems in Cyber Threat Intelligence. The features used for malware detection in ML can be separated into the categories of static analysis and dynamic analysis.

Dynamic analysis involves running a software sample in a sandbox environment and examining the behavior, whereas static analysis aims to determine if a sample is malicious or benign based on analyzing the code or structure.

A popular feature for static malware detection is raw byte sequences. Raw byte sequences have been used with convolution neural networks for the task of malware detection. To expand from malware detection, static analysis has also shown success in malware similarity analysis using deep learning models. A popular deep learning method that has shown recent success is the Siamese Neural Network.

The Siamese Neural Network Architecture is a method of learning for similarity analysis. Siamese networks learn through either a twin or triplet learning algorithm. The Siamese network was first proposed in the work by Bromley et al., "Signature verification using a "siamese" time delay neural network," in Advances in Neural Information Processing Systems, vol. 6., the contents of which are incorporated herein by reference, where a twin Siamese network was proposed for measuring the similarity between human signatures written on a pen-input tablet.

The work of measuring the similarity between two images was applied to a more broad image similarity problem by Koch et al. "Siamese neural networks for one-shot image recognition,", Department of Computer Science, University of Toronto, the contents of which are incorporated herein by reference. In their work, Koch et al. showed a twin Siamese network could be used for comparing image similarity from categories that only contain a single sample in the training data (One-shot classification).

The work of Koch et al. has led to the application of twin Siamese networks in many domains, including malware similarity analysis. The twin Siamese network was expanded to the triplet with FaceNet, as proposed in F. Schroff et al., "FaceNet: A unified embedding for face recognition and clustering," *Proceedings of the IEEE Conference on Computer Vision and Pattern Recognition* (*CVPR*), pp. 815-823, the entire contents of which are incorporated herein by reference. FaceNet is a convolution neural network trained to generate embeddings for face images that could be compared by L2-distance.

Similar to recent works which use Siamese-based architectures for software similarity analysis, in embodiments of the present disclosure, static features extracted from the code base of the malware sample are used. Rather than using image representations of malware executables, or features extracted from reverse engineering techniques, raw byte sequences may be used directly from malware binaries to generate embedding representations.

The Siamese network architecture has been used for classifying malware into a discrete set of malware families. These networks are fitted with a Softmax activation head. The Softmax activation head is used to classify the two samples into the discrete set of malware families that are in the training data. Zhu et al., "A few-shot meta-learning based siamese neural network using entropy features for ransomware classification," *Computers & Security*, vol. 117, p. 102691, the contents of which are incorporated herein by reference, proposed a twin Siamese network with a Softmax activation head for ransomware detection and classification. This method showed success at the few-shot classification of ransomware families.

Y. H. Chen et al., ""Similarity-based malware classification using graph neural networks," *Appl. Sci.* 2022 vol. 12, no. 21, p. 10837, the contents of which are incorporated herein by reference, furthered the work of Softmax-activated networks by designing a multi-head network that would output a family classification, as well as an embedding for similarity analysis.

The works of S. C. Hsiao et al., "Malware image classification using one-shot learning with siamese networks," *Procedia Computer Science*, vol. 159, pp. 1863-1871; and M. Conti et al., "A few-shot malware classification approach for unknown family recognition using malware feature visualization," *Computers & Security* vol. 122, p. 102887, the contents of which are incorporated herein by reference, used a Twin Siamese architecture for malware similarity scoring. Given an unknown sample and a support set, a similarity score is found for each support sample with the unknown sample. The unknown sample is classified into the same family as the support sample with the highest similarity. Hsiao et al. proposed a system for finding the similarity between two malware samples. Using byte-to-pixel images of malware samples as input, Hsiao et al. showed the deep framework proposed in Koch et al., *ibid*, could be applied to the problem of malware similarity scoring. Conti et al. proposed a multi-network system that would find the similarity score on two malware samples based on a three-channel image (Gray-level matrix image+Entropy graph image+Markov image).

The work of C. Molloy et al., "Adversarial variational modality reconstruction and regularization for zero-day malware variants similarity detection," in 2022 *IEEE International Conference on Data Mining* (*ICDM*), pp. 1131-1136, the contents of which are incorporated herein by reference, explored the method of generating embeddings for storage and similarity analysis. In their work, Molloy et al. proposed a Generative Adversarial Network for malware embedding generation with reconstruction. Like the work of Conti et al., Molloy et al. used multiple static feature vectors from a single malware sample as input to their network. Instead of using different image modalities, Molloy et al. used five features extracted from each sample through static analysis (byte code+import text+string text+byte image+byte image signature).

Based on this, and with increasing numbers of novel malware variants and families each year, tools are required for efficient and accurate family matching and unknown (zero-day) family detection. Current state-of-the-art Deep Learning approaches that train with twin or triplet loss do not show any proof of scalability for a real-world malware triage environment. As well, these solutions lack any mechanism for unknown family detection.

Therefore, in accordance with the embodiments of the present disclosure, a multi-Machine Learning (ML) system for malware family classification and zero-day family detection is provided. The embodiments of the present disclosure comprise an embedding network trained in two different scenarios for byte string embedding and an open-set approximate nearest neighbor algorithm for family matching and zero-day detection. The embedding network uses triplet loss for embedding generation and reinforcement-based Expectation Maximization (EM) learning for generalization.

Further, the embodiments of the present disclosure provide an approximate nearest neighbor with open-set classification for scalable malware family detection on byte strings extracted from each sample.

Testing of the embodiments of the present disclosure using multiple in-sample and out-of-sample experiments was performed to ensure the model has no bias towards malware families in training. Testing further found that the embodiments of the present disclosure can detect samples outside the known set of malware samples with a very high accuracy.

Malware Families

As indicated above, challenges for malware analysis include family detection, similarity analysis, and zero-day family detection.

Specifically, with the vast amounts of unique malware samples, they are categorized into families. A malware family is a set of malware that shares a distinct sample of malicious code, as for example described in Turner et al., "Symantec internet security threat report: trends for July 2004-December 2004", *Retrieved* July, vol. 30, p. 2005, 2005, the contents of which are incorporated herein by reference.

In particular, as described in Turner, *ibid*, the first sample in a family is an unseen and unique piece of malicious software. All other samples within the family are variants, iterations of the original sample with minor differences. Following that a variant is a modification of the original code with minor differences, a malware sample can only be categorized into a single family.

Conventional methods of family detection aim to categorize new samples into a family based on a known knowledge space. For example, such conventional methods are described in D. Ucci et al., "Survey of machine learning techniques for malware analysis," *Comput. Secur*., vol. 81, pp. 123-147, 2019; J. Zhu et al., *ibid*; Chen et al., *ibid*; K Huang et al., "Ismcs: An intelligent instruction sequence based malware categorization system," in 2009 3rd *International Conference on Anti-counterfeiting, Security, and Identification in Communication,* 2009, pp. 509-512; Y. H. Park et al., "Fast malware classification by automated behavioral graph matching," in *Proceedings of the 6th Cyber Security and Information Intelligence Research Workshop*, CSIIRW 2010*, Oak Ridge, TN, USA, Apr.* 21-23, 2010; G. E. Dahl et al., "Largescale malware classification using random projections and neural networks," in *IEEE International Conference on Acoustics, Speech and Signal Processing*, ICASSP 2013, Vancouver, BC, Canada, May 26-31, 2013. IEEE, 2013, pp. 3422-3426; and Y. Ye et al., "Automatic malware categorization using cluster ensemble," in *Proceedings of the 16th ACM SIGKDD International Conference on Knowledge Discovery and Data Mining*, Washington, DC, USA, Jul. 25-28, 2010, the contents of all of which are incorporated herein by reference.

An emerging area of research is malware similarity analysis, where methods are proposed for evaluating the similarity between samples of software, allowing for a more nuanced analysis. For example, such approaches are described in C. Molloy et al., *ibid*; S. C. Hsiao et al., *ibid*; and M. Conti et al., *ibid.*

By providing a similarity score between each sample, Cyber Threat Intelligence (CTI) specialists can map the evolution of malware variants for attack campaign monitoring.

Another possible application of malware similarity analysis is zero-day family detection. Zero-day family detection is the challenge of finding novel distinct samples of malicious code to flag for human investigation. With discrete set family classification, there does not exist a mechanism for signaling if an incoming sample is outside the set of families. With samples from zero-day families having unknown signatures, structures, and intentions, a comprehensive CTI system requires zero-day family detection for network defense.

Reference is now made to FIG. 1. Incoming malware typically consists of new variants of known families or samples associated with zero-day attack campaigns. A classification-based approach cannot handle samples for zero-day attacks or new malware families. Using a similarity analysis system, incoming samples are analyzed and compared to samples from known families. If samples are not within a predefined boundary, it is likely a zero-day family.

Specifically, in the embodiment of FIG. 1, known families 110 are separated from samples from a new attack 112. Known families 110 include family 120, family 122 and family 124. Samples from a new attack 112 include a new family 130.

As new malware samples are received, they can be classified into existing families. Thus, in the example of FIG. 1, samples 140, 142 and 144 are classified within family 120. Samples 146 and 148 are classified within family 122. Samples 150 and 152 are classified in family 124.

Samples 154, 156 and 158 are not within a predefined boundary and are therefore classified within a new family 130.

Similarity Analysis

One DL approach to malware similarity analysis is applying Siamese Neural Networks. Siamese Neural Networks learn in either a twin or triplet meta-learning method for direct classification, similarity scoring, or similarity embedding generation.

Methods have shown the ability to match similarity between malware samples on the bases of malware family, for example as described in Molloy et al., Hsiao et al. and Conti et al., ibid. However, only Molloy generated similarity embeddings for Microsoft™ malware. Through leveraging a heterogeneous set of malware descriptors for each sample, Molloy et al. designed an embedding network for malware sample storage and family detection.

Although Molloy et al., has shown success at matching samples through measuring the distance between embeddings, there are challenges within the domain of malware similarity analysis that have not been addressed. One such challenge is accurately matching malware samples that have been explicitly modified for evasion. Such challenges are, for example, outlined in C. Molloy et al., "H4rm0ny: A competitive zero-sum two-player markov game for multi-agent learning on evasive malware generation and detection," in 2022 *IEEE International Conference on Cyber Security and Resilience* (*CSR*), pp. 22-29 [molloy-2]; and O. Suciu et al., "Exploring adversarial examples in malware detection," in 2019 IEEE Security and Privacy Workshops, SP Workshops 2019, San Francisco, CA, USA, May 19-23, 2019. IEEE, 2019, pp. 8-14, the contents of both of which are incorporated herein by reference.

In Molloy-2, ibid, it was shown that shown that appending benign bytes to the end of a malware sample provides a method for evading an ML-based malware classifier.

Figure 2:
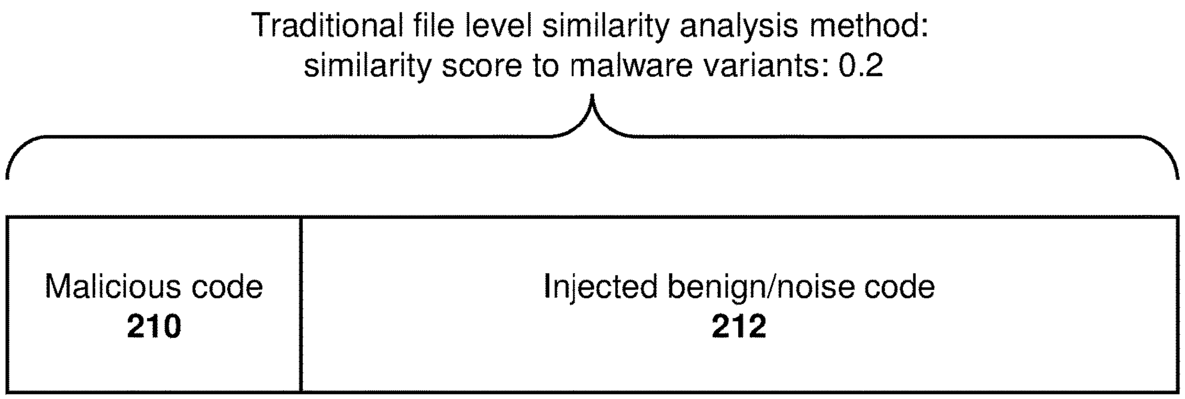
FIG. 2 is a block diagram showing traditional family level similarity analysis.

Thus, referring to FIG. 2, malicious code 210 has benign (or noise) code 212 injected to it. This results in a low similarity score when analyzing the combination of the malicious code 210 and the benign code 212 using traditional file level similarity analysis. In the example of FIG. 2, this is shown as a similarity score of 0.2. However, such similarity score is merely provided as an illustration, and those skilled in the art will appreciate that the similarity score for a file will vary based on the sample.

One potential solution against this method is by fragmenting incoming samples and performing similarity analysis on each fragment, then aggregating the fragmented results.

Figure 3:
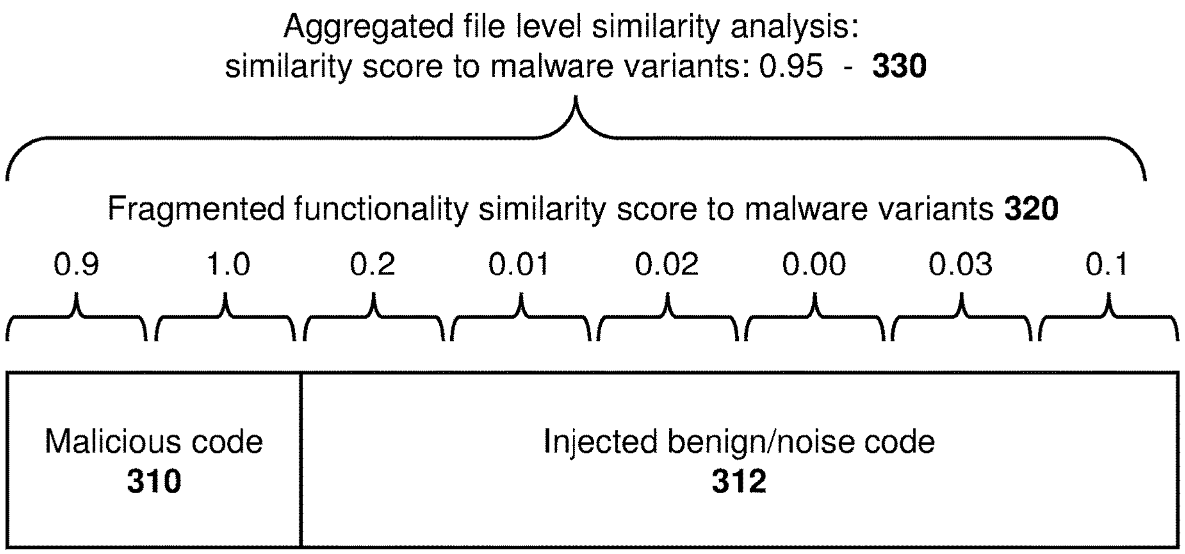
FIG. 3 is a block diagram showing the fragmenting of a sample and the aggregation of the results for similarity analysis.

Reference is now made to FIG. 3. In the example of FIG. 3, malicious code 310 has benign code 312 injected after it. Malicious code 310 and benign code 312 may be the same as malicious code 210 and benign code 212 from FIG. 2.

However, in the embodiment of FIG. 3, a first step 320 involves the fragmenting of the file into various code segments. Each of these code segments can then be analyzed for a similarity score to malware variants. Thus, as seen from FIG. 3, in step 320 the malicious code 310 is fragmented and analysed. Similarly, the benign code 312 is fragmented and analyzed. As will be appreciated by those in the art, the delineation between the malicious code 310 and benign code 312 would generally not be known in advance for an unseen malicious code sample.

After analysis, the fragments of the malicious code 310 have a high similarity score, whereas the segments of the injected benign code 312 has a low similarity score.

A second step 330 may then be used to aggregate a file level similarity. In the example of FIG. 3, the file level analysis through aggregation at step 330 produced a similarity score of 0.95, which is significantly higher than the embodiment of FIG. 2. However, such similarity score is merely provided as an illustration, and those skilled in the art will appreciate that the similarity score for a file will vary based on the sample.

Matching at the fragment level can help alleviate the issue of byte injection, as the decision-making process does not have to consider all fragments equally. However, creating a solution that performs fragment-level matching is difficult. In contrast to current solutions, the input dimension to the Siamese network in a fragment-based solution is much smaller. In practice, it was found that networks performed well in the triplet training task, but when transferred to a deployed environment where incoming fragments were compared to known fragments for similarity analysis, performance decreased dramatically.

To address this neighbor search challenge, training may be provided for neighbor search. Such training may simulate a deployment environment, where fragments are matched to their closest neighbor for similarity analysis, as in step 320 of FIG. 3.

This method uses a set of fragments pre-embedded by the network for training samples to search through (support set). However, this training cannot optimize the model directly, because the support set used would contain the error of the model, making it only an approximation of the optimal. Therefore, an iterative training method that updates both the network and the support set is provided herein for network optimization.

A solution to this approach is Expectation Maximization (EM). EM is an iterative approach to finding the optimal parameters of a statistical model that cannot be solved directly. By interpreting the search results on training samples as a probability distribution of families, a reward can be derived and trained through the network using a Reinforcement Learning (RL) paradigm. Then, the support set can be re-generated with the updated distribution parameter estimates.

In accordance with embodiments of the present disclosure, a malware embedding and open-set family detection system is provided which leverages multiple machine learning modules. Such family detection system can, in some environments, be divided into three subcomponents.

A first subcomponent is an embedding network that embeds strings of software bytecode. For example, in some embodiments, the bytecode may be one kilobyte (1024 bytes) long. However, other lengths of the bytecode are possible, and the present disclosure only uses one kilobyte for illustration purposes.

The embedding network aims to generate an embedding for a byte string that best represents the functionality of the kilobyte instead of an embedding that best represents the family of the sample.

In some embodiments, the embedding network is trained on triplet pairs derived from malware and benignware to ensure a differentiation in byte string functionality.

A second subcomponent is a training gym environment. In particular, the training gym environment is used to address the challenge of fragment matching and comprises a dynamic embedding nearest neighbor matching gym.

The training gym environment conducts a nearest neighbor search on a changing support set for network generalization. Due to a direct loss being calculated from similarity search being non-differentiable, an RL scheme is used with EM for sequential search and update training.

Training the embedding network in a simulated malware triage environment after initial training raises family matching accuracy, and decreases the distance between samples within the same family.

A third subcomponent comprising a matching environment. The matching environment builds on approximate nearest neighbor algorithms for open set family detection, as for example described by Y. A. Malkov et al. in "Efficient and robust approximate nearest neighbor search using hierarchical navigable small world graphs," *IEEE transactions on pattern analysis and machine intelligence*, vol. 42, no. 4, pp. 824-836, 2018, the contents of which are incorporated herein by reference.

Thus, the embodiments of the present disclosure provide a multi-ML system for malware family detection that leverages the meta-learning structure of Siamese Neural Networks.

The embodiments of the present disclosure further provide an RL method for further training the embedding network for dynamic support set nearest neighbor search.

The embodiments of the present disclosure further combine decision fusion of byte string family classification from open-set nearest neighbor family matching for fast and accurate malware classification.

The embodiments of the present disclosure have been implemented in practice, where such embodiments have been trained on real-life malware samples and the system has been evaluated on in-sample, and out-of-sample malware families in chronological order. Results from such practical implementations show that the model outperforms current state-of-the-art methods for malware variant similarity analysis in both known, and zero-day family detection.

The model will be described below with regards to both training the model and deployment of the model. Training the model is broken into two stages, the first being described with regards to FIG. 4 and the second being described with regards to FIG. 5. Deployment is described below with regard to FIG. 6.

Figure 4:
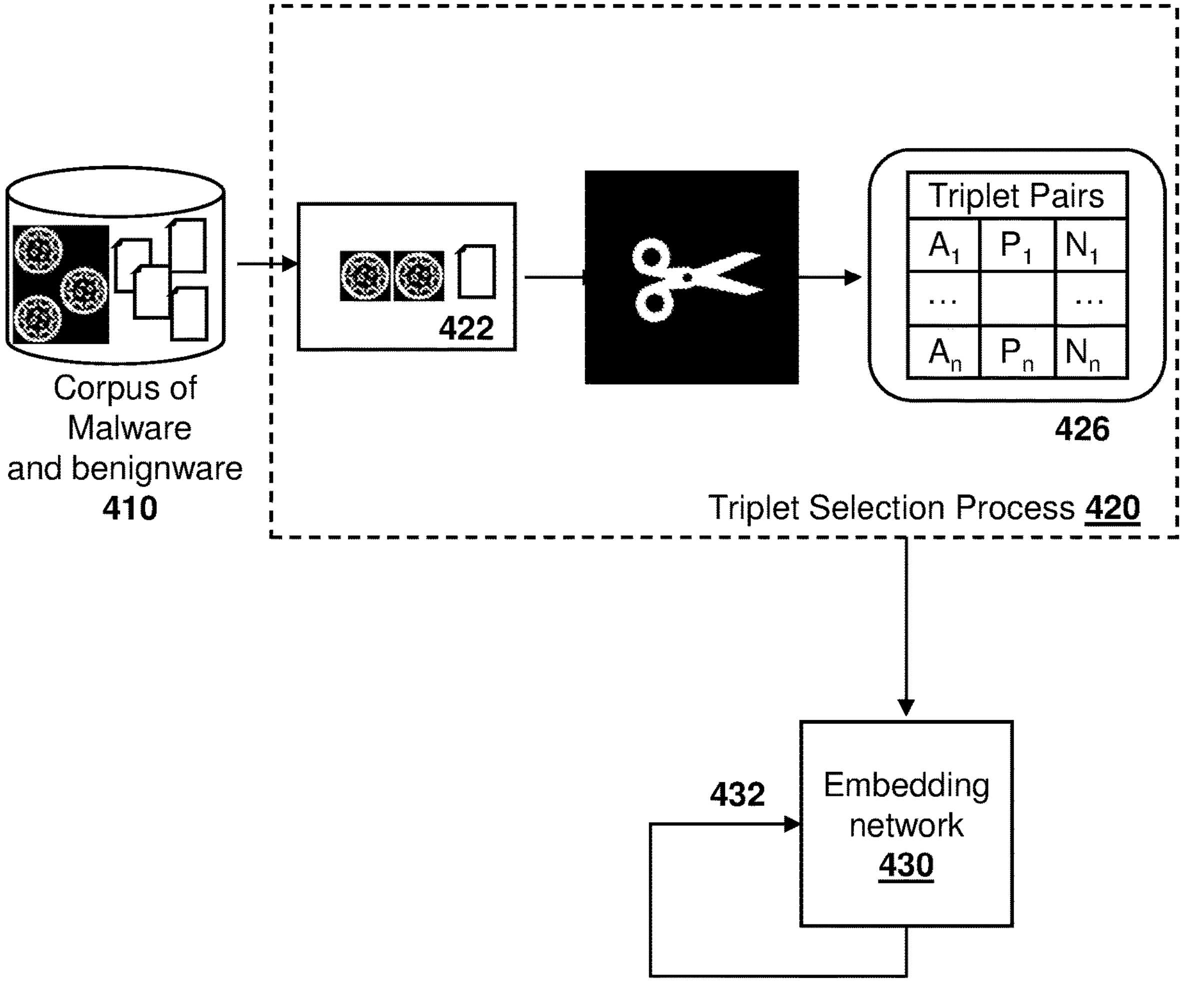
FIG. 4 is a block diagram showing training of an embedding network from a corpus of malware and benignware.

Reference is now made to FIG. 4, which describes the embedding network training. In particular, the embedding network is a deep convolution network for byte string embedding. Given a string of bytes from a software executable, the embedding network generates an embedding that represents the byte string in Euclidean space.

In some cases, the byte string may include 1024 bytes. However, in other cases, fewer or more bytes could be included. Specifically, the input to the embedding network is a byte string of certain length extracted from the malware. The length may be chosen to balance the amount of functionality that can be modelled by the byte string, with the input size to the neural network. As well, the batch mode of computation done within Central Processing Units (CPUs) and Graphics Processing Units (GPUs) may be considered.

A byte string is a vector of integer values with the range [0, 255] with each value representing a byte of binary code. Byte strings were chosen as the input modality to the embedding network of the present disclosure due to the speed and accuracy of extraction. Many ML-based systems designed for malware analysis require each sample to be decompiled prior to analysis. However, decompilation is not a deterministic process, and many parameters within decompilation software may greatly affect the resulting source code that is used to analyze the sample. Byte strings can be read directly from the executable file, removing any non-deterministic process from the embedding system.

Thus, in the embodiment of FIG. 4, a corpus 410 of malware and benignware is provided.

A triplet selection process 420 comprises the selection of two malware variants from the same family, as well as a benign sample, from corpus 410, as shown at block 422.

The chosen malware variants and benign sample are then fragmented at block 424 into byte strings of a selected length.

The fragments are then arranged into triplet pairs at block 426, where the anchor and positive of each triplet pair are from the same malware family and the negative is chosen from the benign sample.

More specifically, in the triplet selection process 420, files are chosen with replacement from a corpus 410 of malware and benignware. Three files are chosen from the corpus for a single triplet pair. The files used for the anchor and positive are chosen from the same malware family without replacement. The negative is chosen randomly from the set of benignware. Each file may be defined as a set of byte strings. Each set may be defined to contain all non-overlapping byte strings of particular length contained in the chosen file. This method removes the final byte string of each file that is less than the chosen length to avoid any negative impact on similarity training caused by padding that would be necessary on the final byte string to extend it to the chosen length in bytes. For the anchor, positive, and negative, the byte string vectors may be defined as a, p, and n respectively.

For the triplet pair, an index q is randomly chosen as the starting index, subject to the following constraints:

$$q \equiv 0 \text{ mod length} \tag{1}$$

$$q < \min(\dim(a), \dim(p), \dim(n)) - \text{length} \tag{2}$$

In equations (1) and (2) above, the length is the chosen length. For example, if the chosen length is 1024 bytes, then length would be 1024.

The constraints in equations (1) and (2) omit the byte string at the end of each file. A triplet pair is the byte strings of chosen length from a, p, and n at index q.

The triplet selection process 420 is then repeated to create a large data set of triplet pairs. The data for training and validating the embedding network is generated using this method. For a set of malware and benignware, a large number of unique triplet pairs can be sampled for training.

The maximum number of triplet pairs that can be generated from a set of malware and a set of benignware can be defined as follows. First, the software cutting function may be defined as: $c: \mathbb{N}^{\alpha} \rightarrow \mathbb{N}$, where α is arbitrary and has an input of a software sample, and outputs the number of byte strings that can be generated from the sample. Cutting function c may be defined as:

$$c(l) = \dim(l) - \dim(l) \text{ mod length} \tag{3}$$

where l is a software sample.

Given a set of malware $\mathbb{M} = \{\mathbb{F}_1, \mathbb{F}_2, \ldots, \mathbb{F}_m\}$, of size m, where $\mathbb{F}_j$ is a set of malware samples in family j, and a set of benignware $\mathbb{S} = \{b_1, b_2, \ldots, b_k\}$ of k benign software samples, for an arbitrary malware family $\mathbb{F}_{\sqsupset} = \{f_{j,1}, f_{j,2}, \ldots, f_{j,p}\}$ with p samples, the number of triplet pairs that can be made for arbitrary malware sample $f_{j,r}$ can be computed by:

$$\sum_{y=1}^{k}\left[\left(\sum_{x=1}^{p}\min(c(f_{j,r}), c(f_{j,x}), c(b_y))\right) - c(f_{j,r})\right] \tag{4}$$

Equation (4) can be expanded over each file in a malware family, and over each family in the set of malware $\mathbb{M}$. This software cutting process allows the generation of very large datasets for model training.

As an example, given a malware family with two samples, each 1 megabyte (1048576 bytes) in length, and a set of benign software, each sample 1 megabyte in length, previous works in this area would be able to generate two triplet pairs. However, in accordance with the triplet selection process of block 420, the software cutting allows for 2000 unique triplet pairs. This wide range of possible training examples from a small set of software allows for a more diverse training set given the same malware samples when compared to prior art.

Referring again to FIG. 4, these triplets can then be used for embedding network training. In particular, an embedding network 430 may be initialized with random weights.

Embedding network 430 is used in the malware family detection space, where the input to embedding network 430 comprises byte strings of the raw executable. This differs from past work on malware similarity analysis through Siamese networks, which have previously generated either embeddings or similarity scores based on information from the entire sample. Thus, whereas prior work aims to train a network for finding a similarity between entire malware samples, one motivation of the present systems and methods is to reduce the effect of minor changes made to malware by creating multiple embeddings for a single sample.

The structure for embedding network 430 may, in some cases, be based on the FaceNet architecture proposed in F. Schroff et al., *ibid.*

The structure of FaceNet is a collection of two-dimensional convolution, pooling, and normalizing layer blocks. Due to the input of embedding network 430 being one-dimensional byte strings, the two-dimensional convolution layers are replaced with one-dimensional convolution in some embodiments.

The FaceNet architecture has seen great success in the domain of image embedding. Similar networks have also seen success in the malware similarity analysis domain without the use of normalization layers throughout the network, as for example described in Hsiao, *ibid.*

Although embedding network 430 works within the domain of malware analysis, embedding network 430 normalizes data throughout the architecture due to the embedding nature more resembling Facenet than other networks in malware similarity analysis. Although it is typical to use sequence-based network layers on one-dimensional byte strings, such as a Long Short Term Memory or Gated Recurrent Unit layer, one-dimensional convolution layers have seen success in the area of malware detection with the added benefit of reduced runtime, as for example described by E. Raff et al., "Malware detection by eating a whole EXE," arXiv:1710.09435v1, the contents of which are incorporated herein by reference.

The structure of the embedding network 430 can be seen in Table 1 below. In the example of Table 1, the embedding network 430 architecture has fewer convolution blocks than previously discussed work; this was chosen due to the input dimension of the embedding network 430 being significantly smaller than the other networks discussed above.

TABLE 1

Structure of Embedding Network Deep Convolutional Network

| Layer | Size-In | Size-Out | Kernel | Params |
|---|---|---|---|---|
| Embedding | 1024 | 1024 × 8 | | 2048 |
| conv 1a | 1024 × 8 | 897 × 64 | 128 | 65600 |
| mpool | 897 × 64 | 224 × 64 | | 0 |
| bnorm | 224 × 64 | 224 × 64 | | 256 |
| conv 1b | 224 × 64 | 193 × 32 | 32 | 65568 |
| mpool | 193 × 32 | 96 × 32 | | 0 |
| bnorm | 96 × 32 | 96 × 32 | 16 | 128 |
| conv 1c | 96 × 32 | 81 × 32 | | 16416 |
| mpool | 81 × 32 | 20 × 32 | | 0 |
| bnorm | 20 × 32 | 20 × 32 | | 128 |
| flatten | 20 × 32 | 640 | | 0 |
| L2 | 640 | | | 0 |
| Total | | | | 150144 |

Embedding network 430 is then trained with a triplet loss, as shown by arrow 432. In particular, the embedding of a byte string x may be represented as $f(x)\in\mathbb{R}^d$ where $f(\cdot)$ is embedding network 430, and d is the output dimension of the embedding network 430. As described in Table 1 above, the output dimension of $f(\cdot)$ is d=640.

The training of the embedding network 430 is done using a Euclidean triplet loss derived in Schroff, ibid. This is now described in more detail.

The embedding network 430 does not learn from any ground truth, but compares its output of different samples for deriving a loss. For a loss calculation of the embedding network, three byte strings are used. The first two are byte strings of a first length, for example 1024 bytes, from different samples in the same malware family at the same starting index. These two samples are the anchor and the positive. The anchor sample is denoted as $x^a$ and the positive sample is denoted as $x^p$.

The third byte string is a random byte string from a benign sample. The third byte string is the negative and is denoted as $x^n$. Using a benign sample as the negative for the training is a non-trivial decision. In prior works on malware family detection using similarity loss, the motivation of the model training is to find the similarity in malware families, whereas the motivation of training the embedding network 430 is to find the similarity of byte string functionality. Using benign software as the negative sample ensures differing functionality between the negative and the positive.

Triplet loss is calculated by finding the difference in distance between the anchor, positive, and negative. The motivation for this loss is training the embedding network 430 to output embeddings close to one another in Euclidean space if they have similar functionality, and apart from one another if they have differing functionality.

The set of a single anchor, positive, and negative is known as a triplet pair, $\mathbb{T}$. Embedding network 430 is trained on the loss of a batch of triplet pairs of length b at each train step. The batch is denoted as $\mathbb{B}=\{\mathbb{T}_1, \mathbb{T}_2, \ldots, \mathbb{T}_b\}$ where $$\mathbb{T}_i = \{x_i^a, x_i^p, x_i^n\}.$$

For a single train step, the loss L may be calculated according to equation (5).

$$L = \sum_{i=1}^{b}\left[\|f(x_i^a) - f(x_i^p)\|_2^2 - \|f(x_i^a) - f(x_i^n)\|_2^2 + \alpha\right]_+ \quad (5)$$

where α is a margin enforced between positive and negative pairs. Due to the distance function in the loss being unbounded (the range of Euclidean distance is [0, ∞)), learning on all triplet differences slows down convergence. The constant α ensures only triplet differences that are within the specified margin are trained through the network. For embedding network 430 training, in one case α=0.2 was chosen, due to its success in Schroff, *ibid*. However, other values are possible.

In some cases, the embedding network 430 was trained using the Adam Stochastic Gradient Descent method described in D. P. Kingma et al., "Adam: A method for stochastic optimization," *arXiv preprint* arXiv:1412.6980, 2014, the contents of which are incorporated herein by reference. In this example, the embedding network mode was trained with a learning rate of 0.0001 for 10 epochs.

Thus, equation (5) may be used to calculate triplet loss for training embedding network 430 as shown at arrow 432.

Gym Environment

The gym environment is used to aid in network generalization. Given an embedding network, a training set, and a support set, the gym environment uses an RL technique to further train the embedding network.

In previous works, as well as in evaluating the embedding network 430 system of FIG. 4, it was found that the embedding network is strong at creating similar embeddings for samples in the same family but fails to create a great distance between samples that are from different families. To aid the problem of embedding separation, embedding network 430 may be trained in a simulated deployment gym.

Figure 5:
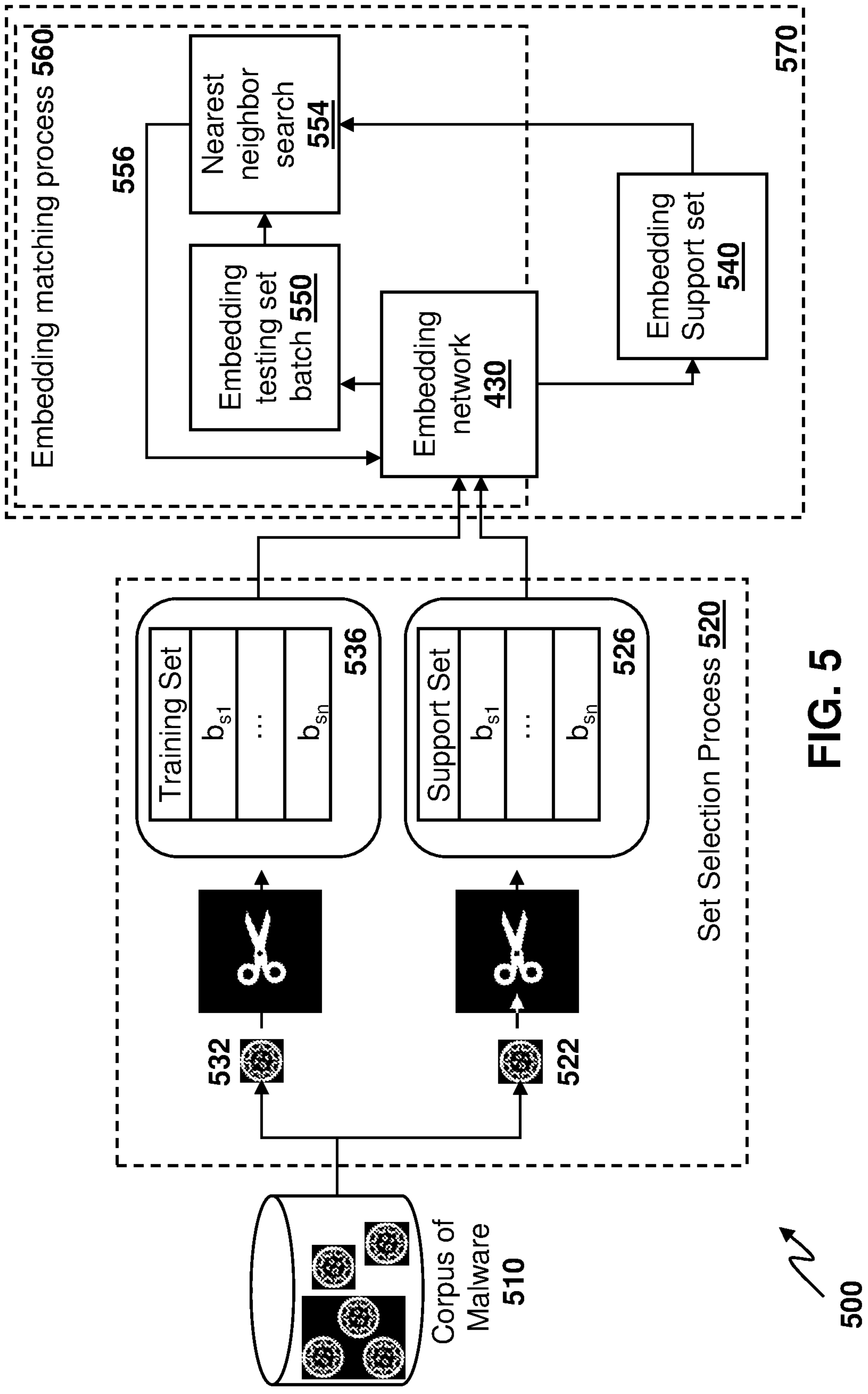
FIG. 5 is a block diagram of a gym environment showing the further training of the embedding network.

Reference is now made to FIG. 5, which shows a gym environment 500. Gym environment 500 is a secondary training for the embedding network 430 for promoting generalization over different families.

Given an embedding network 430, denoted as $f(\cdot)$, a training set, and a support set, an EM approach may be taken to training the network. EM is a two-step algorithm for estimating underlying parameters to a distribution, as for example described in T. Moon, "The expectation-maximization algorithm," *IEEE Signal Processing Magazine*, vol. 13, no. 6, pp. 47-60, 1996, the contents of which are incorporated herein by reference. In this case, the distribution is the probability distribution that a training sample is within each family used for the support set. The network, $f(\cdot)$, is an estimator of a probability distribution that is optimized through this EM learning process. In particular, the distribution that the system is trying to estimate may be considered the perfect malware embedder. Given that both the training and support set do not have the perfect embeddings, an EM approach may be needed to iteratively train the network for family classification.

First, the probability distribution of each training sample is found in batches and trained into the network. Second, after each training epoch, the embedding network, $f(\cdot)$, can yield more accurate embeddings, so each byte string in the support set is embedded with the updated parameters of $f(\cdot)$, and the training continues. Such an algorithm may be required for training due to both the training and support set being estimations of an unknown distribution.

Thus, in FIG. 5, given a collected corpus of malware 510, a set selection process 520 comprises choosing two different variants from the same family from a random family. These are shown as first variant 522 and second variant 532.

First variant 522 is fragmented at block 524 and second variant 532 is fragmented at block 534. A support set 526 and a training set 536 are generated from the byte strings.

The gym environment 500 embeds all samples in the support set 526 and stores them for training. Further, gym environment 500 embeds samples in the training set 526 in batches. For each batch of training samples, the gym environment 500 loss is derived and propagated through the embedding network $f(\cdot)$. Once all training batches have been evaluated, the embedding network $f(\cdot)$ embeds the support set with the newly trained parameters. This iteration of training matches that of an EM system. The set selection process 520 is thus repeated to create large and diverse training and support sets.

Embedding network 430 may be pre-trained, for example using the embodiment of FIG. 4.

Embedding network 430 then embeds the support set 526, as shown at block 540.

Network 430 then embeds a batch of the training set 536, as shown at block 550.

At block 554, a neighbor search is conducted on each sample in the training batch to the support set 526. A reward is then calculated for the batch matching and is propagated through the embedding network 430, as shown with arrow 556.

In particular, for the gym environment 500 training process, a novel EM loss may be defined. Due to approximating probability distribution being non-differentiable, a reinforcement learning approach may be taken for creating a reward based on the probability distributions of each training sample. For gym environment 500 training, a support set $\mathbb{S}=\{\mathbb{F}_1, \mathbb{F}_2, \ldots, \mathbb{F}_n\}$ of n sets of malware families is used. Each $\mathbb{S}_i=\{e_{i,1}, e_{i,2}, \ldots, e_{i,n}\}$ is a set of embeddings from malware family i. For a given training sample s in malware family $0 \le t \le n$, the reward is the probability that sample is s in family t. To find this probability, the family minimum distance function $m(\cdot,\cdot)$ may be defined in accordance with equation (6).

$$m(a, \mathbb{E}) = \min_{e \in \mathbb{E}} \|f(a) - f(e)\|_2^2 \tag{6}$$

where $\alpha$ is a single embedding, and $\mathbb{E}$ is a set of malware embeddings. For sample s in family t, the family minimum vector m may be found according to equation (7).

$$m = (m(s, \mathbb{F}_1), \ldots, m(s, \mathbb{F}_n)) \tag{7}$$

where the value in index i of vector m is the shortest distance between the training sample s and the embeddings in malware family $\mathbb{F}_i$. The family probability vector p may be calculated in accordance with equation (8).

$$p = \|m\| \tag{8}$$

This normalizes the family minimum vector so the sum of all elements in p is 1, making each element $p_i$ the probability that sample s is in family i. The reward for training sample s is $r=p_t$. The loss propagated into the network is $1-r$. As described above, the loss is averaged over batches before being propagated through the network.

In experiments, the gym environment 500 training process was trained for 100 epochs using the Adam Stochastic Gradient Descent method with a learning rate of 0.000001.

Referring again to FIG. 5, the batch neighbor search is conducted over the entire training set 536, as shown by block 560. Further, at the end of the training from the entire set, the support set 526 is embedded with the updated embedding network 430 and the training continues, as shown by block 570.

Two example training algorithms for the gym environment 500 are shown in Tables 2 and 3 below. Table 2 shows an expectation algorithm and Table 3 shows a maximization algorithm.

TABLE 2

Training Gym Environment Expectation Algorithm

```
Input: embedding function f(·), optimizer function
  a(·, ·)
Output: embedding function f(·)
Data: testing set T, support set S
1 for Bin T do
2   L = [ ]
3   for b in B do
4     D = [ ]
5     for F in S do
6       D·add(min_{s∈F} ||f(b) − s||_2^2)
7     end
8     D = normalize(D)
9     r = D[b.true_family]
10    l = 1 − r
11    L.add(l)
12  end
13  f.update weights(a(B, L))
14 end
15 return f(·)
```

For the expectation algorithm, the testing and support sets are used along with the embedding function and the chosen optimizer. As discussed above, the embedding function is embedding network 430, and the optimization algorithm is Adam.

In Table 2, line 1 loops through each batch of data in the training set.

Line 2 of Table 2 initializes the loss variable L.

Line 3 iterates over each sample b in the batch B.

Line 4 initializes the distribution to an empty array.

Line 5 iterates over each family set in the support set.

Line 6 finds the shortest distance between the testing samples and all the embeddings in family F. That shortest distance is then added to the family distribution.

Line 8 normalizes the distribution with a Euclidean-ordered normalization algorithm.

Line 9 of Table 2 calculates the reward for sample b by finding the probability that sample b is in the correct family from the family distribution D.

Line 10 calculates the loss from the reward.

Line 11 adds the sample loss to the batch loss set.

Line 13 updates the weights to the embedding function $f$ from the batch of data, the loss, and the optimizer.

Line 15 returns the embedding function with the new weights.

TABLE 3

Training Gym Environment Maximization Algorithm

```
Input: embedding function f(•), family size x
Output: support set S
Data: support super set S'
1     S = [ ]
2     for F' in S' do
3       F = [ ]
4       F' = random sample(F' , x)
5       for s' in F' do
6         s = f(s' )
7         F.add(s)
8       end
9       S.add(F)
10    end
11    return S
```

Table 3 is the maximization step of the EM algorithm. Given the embedding function, the family size, and the support super set, a support set is generated for training.

In Table 3, line 1 initializes the support set S.

Line 2 iterates over each family in the support super set.

Line 3 initializes the family set F.

Line 4 takes of a random sample of size x from family F'.

Line 5 iterates over each sample in the family F'.

Line 6 embeds the sample.

Line 7 adds the embedding to the family set F.

Line 9 adds the family set to the support set S.

Line 11 returns the updated support set for training in the algorithm of Table 2.

Thus, the first step of the EM training is initializing the first support set with the algorithm of Table 3.

From the above, training of the embedding network can be done in two stages, shown with the embodiments of FIG. 4 and FIG. 5.

Deployment

Figure 6:
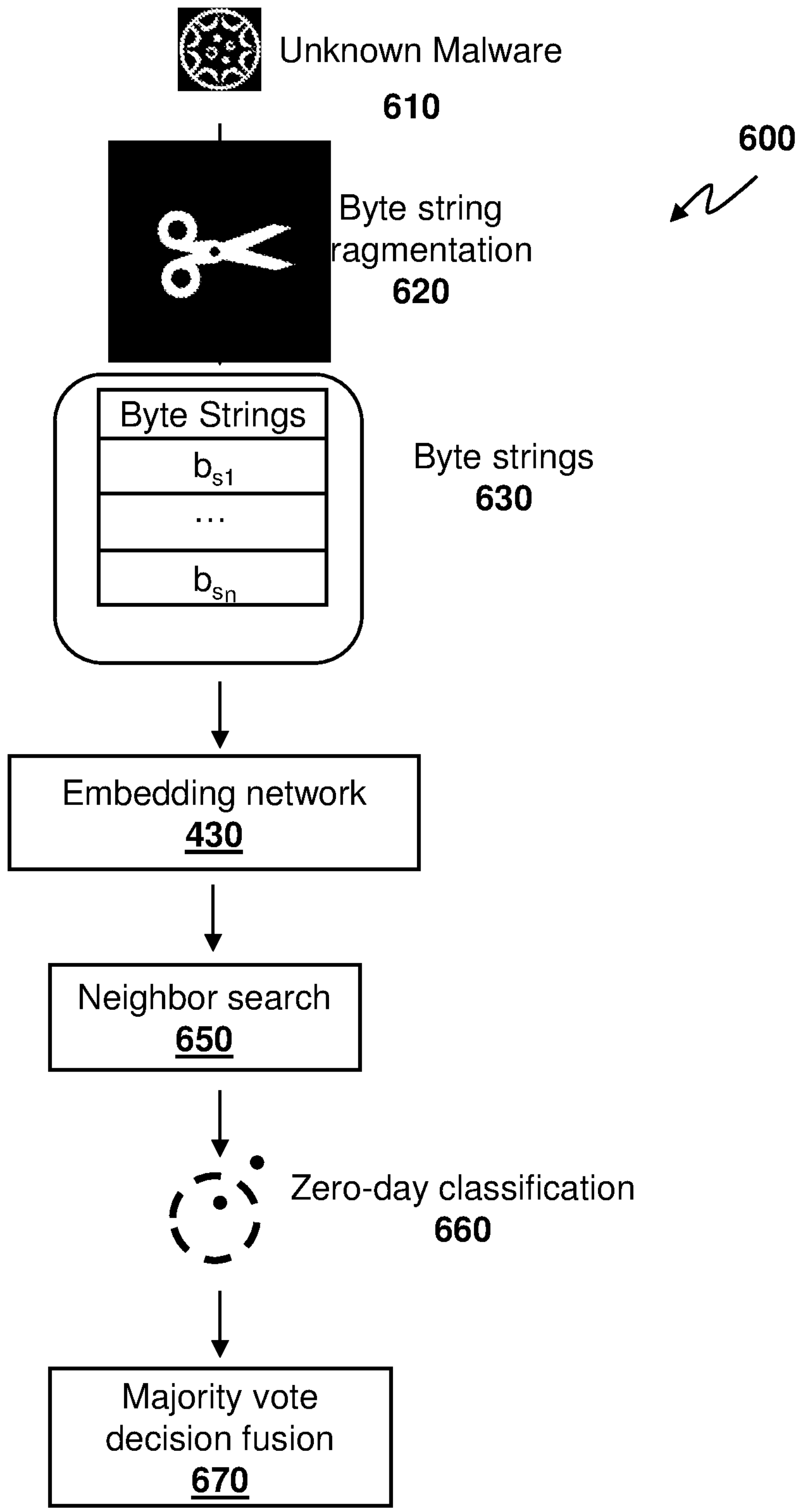
FIG. 6 is a block diagram of a matching environment for matching unknown malware byte strings to a family and/or classifying the byte strings as zero-day samples.

Once training has been completed, the embedding network can be used in a deployment situation to classify malware and find zero-day malware samples. Reference is now made to FIG. 6.

FIG. 6 shows a matching system 600, which is an open set approximate nearest neighbor search algorithm that builds on Hierarchical Navigable Small World (HNSW) done by Malkov, ibid.

In the example of FIG. 6, an unknown malware sample 610 is provided to matching system 600. In particular, at block 620 malware sample 610 is fragmented to a given length. The given length is the same as the length used for training the embedding network 430.

At block 630, the fragmented byte strings are organized for embedding.

The organized, fragmented byte strings are then run through the embedding network 430 to generate an embedding for each set length byte string in the malware sample.

For each of the embeddings, at block 650 the first nearest neighbor is found.

At block 660, a zero-day classification is done on the unknown byte strings based on the embeddings. In particular, for each of the nearest neighbors, if the neighbor is outside of the predefined known threshold r, set the class of the byte string as 'unknown'.

Then, at block 670, the process may set the predicted class of the malware sample by majority vote decision fusion on classes of the embedded byte strings.

This process of FIG. 6 allows for fast classification of malware that does not require calculations in an order greater than one for the zero-day classification of a byte string.

Malkov, ibid, proposes an approximate K-nearest neighbor search based on navigable small world graphs with a controllable hierarchy. Navigable small world networks are networks with logarithmic or algorithmic scaling of the greedy graph routine, as for example described in J. M. Kleinberg, "Navigation in a small world," Nature, vol. 406, no. 6798, pp. 845-845, 2000, and in M. Boguñá et al., "Navigability of complex networks," CoRR, vol. abs/0709.0303, 2007., the contents of both of which are incorporated herein by reference.

The embedding of known byte strings and the process of block 650 of the system of FIG. 6 expand on Malkov, ibid. In particular, the embedding of known byte strings constructs a graph structure by iteratively inserting embedded malware byte strings. The insertion of a single embedding is as follows. Starting at the highest layer of the graph, a greedy algorithm is used to find the nearest neighbors of the incoming embedding. Then, the insertion algorithm moves to find the nearest neighbors of the next layer down, following the connection from the previously found nearest neighbors. This process continues for all layers in the hierarchy. The greedy algorithm from Malkov, ibid. is built on the algorithm from Y. Malkov, "Approximate nearest neighbor algorithm based on navigable small world graphs," *Inf. Syst.*, vol. 45, pp. 61-68, 2014. [Malkov-2], the contents of which are incorporated herein by reference.

Once all levels in the hierarchical graph have been evaluated, the incoming sample is connected to the nearest neighbor found in the iterative search process. In some cases, the greedy algorithm looks for the single closest neighbor in each level of the hierarchy. As well, following the Euclidean distance loss used for training the embedding network system, a Euclidean distance for measuring the distance of samples in the graph may be used.

Thus, as provided above, incoming malware sample 610 is preprocessed by fragmenting, organizing, and using the embedding network 430 to embed the malware sample byte strings into the same vector space as the stored malware embeddings. For each byte string in the incoming sample, the byte string is embedded and awaits classification.

The process of block 650 is run for each embedding generated for a single sample. For each embedding, the classification and the distance between the incoming embedding and its nearest neighbor is saved.

With regard to zero-day classification at block 660, if an incoming sample is outside the boundary of known malware embeddings, it is classified as a zero-day sample. For an embedding, if the distances between the embedding and its nearest neighbor is greater than a chosen r, and the classification of the embedding is set to 'unknown'.

Further, with regard to block 670, this block provides the decision fusion of the embedding classifications. Given the classification of all of the embeddings for a malware sample, the most popular classification is set as the predicted classification of the sample.

In a real-world environment, once a sample has been classified, all embeddings are added to the matching system graph with the predicted class as the ground truth classification. For evaluating the system, testing samples were not added to the graph after classification. For evaluation, in one case $\tau=0.01$ was used. However, other values could be used in other cases.

If a sample is classified as 'zero-day' at block 670, it may then be flagged for an action. The action may be, for example, to be brought to attention of a malware researcher for study. This may be used to determine the origin, nature, effect, or behavior of the malware. It may be used for the development of detection algorithms to detect and/or block the malware, for example for antivirus programs. It may be used for the creation of malware removal algorithms to remove the malware, among other actions.

Experiments

The processes of FIGS. 4, 5 and 6 were tested with real world data. Three different datasets were used for conducting validity experiments on the methods and systems of the present disclosure. Specifically, multiple datasets of chronologically categorized data were used.

Further, four experiments were conducted to check the validity of the present systems and methods. The first two experiments were conducted to show that the systems and methods were generalizable to different malware families. The second two experiments were used to show if the present systems and methods could reliably separate known malware families from unknown malware families. Also, multiple state-of-the-art ML methods and Siamese-based malware family detection methods were compared against the present systems and methods in family matching ability.

Three different datasets in total were used for training and evaluating the present systems and methods. The first was a training dataset, training-2021, and was a collection of real-world malware samples identified in the year 2021, and benign samples from varying years.

The second and third datasets were testing datasets. The two testing sets were datasets of malware identified in the first and second quarters of 2022.

The data was separated chronologically to better simulate a real-world malware triage environment. A visualization of the datasets can be seen in FIG. 7. However, as would be appreciated by those skilled in the art, the use of such datasets and structures is merely one example, and the embodiments of the present disclosure could equally be used with other datasets and other data structures.

Figure 7:
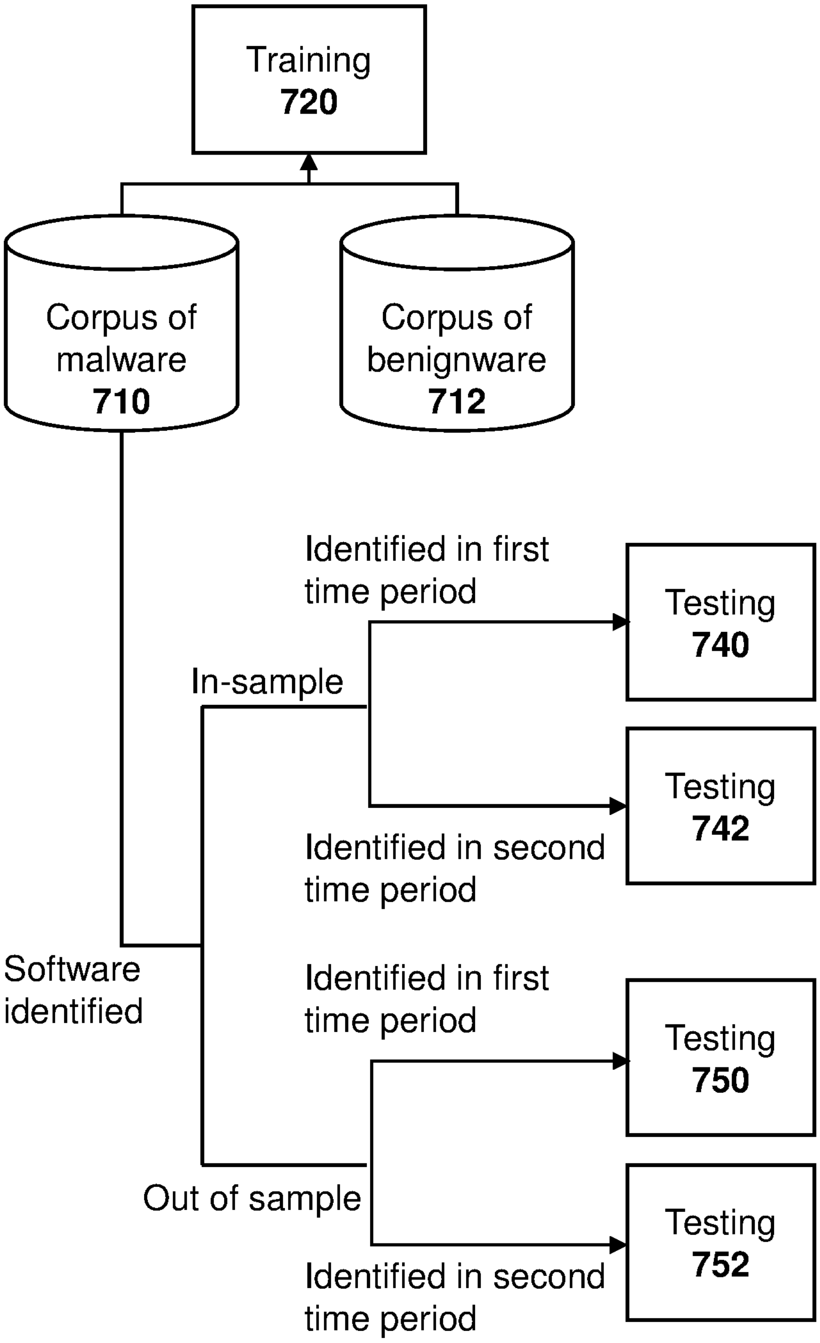
FIG. 7 is a block diagram showing the use of different datasets in training and testing of the embodiments of the present disclosure.

In the embodiment of FIG. 7, a corpus of malware 710 and a corpus of benignware 712 are available in the system.

A training dataset 720, which in the example of FIG. 7 comprises malware found in 2021, was a corpus of malware and benignware used for generating the triplet pairs for embedding network 430 training, and the testing and support sets used for gym environment 500 training. All malware samples in the training corpus were collected from the online repository Malware Bazaar. Benign files used were collected from various online repositories.

The training dataset 720 was comprised of 50,248 malware samples sampled from 175 families, and 7,828 benign samples from varying software vendors. All samples used were Windows Portable Executable files. As described above, the benign samples were only used for generating the negative samples of the triplet pairs.

One million triplet pairs were generated from the corpus for the embedding network 430 training. Triplet pairs were randomly sampled byte strings from the corpus of malware and benignware with replacement. As described with regard to FIG. 5, the gym environment 500 training uses a support and a testing set. The support set was a dataset of malware embeddings that would act as the simulated malware repository that a Cyber Threat Intelligence organization would use for comparing incoming samples to known samples. For each of the 175 families in the training data, two samples were chosen, and all set length byte strings (e.g. 1024 bytes) of those samples comprised the support set. As well, the testing set was the set length byte strings (e.g. 1024 bytes) of two samples randomly sampled from each family in the training data.

Two datasets were used for testing the present systems and methods. For the experiments conducted, these datasets were malware samples identified in the first and second quarter of 2022 respectively.

As described previously, all the malware used for training and for evaluating the efficacy of the present systems and methods was separated to better simulate a real-world environment. Two separate testing sets were used due to the nature of the present systems and methods. Specifically, the present system and methods used a support set of samples that were stored for matching. The testing set from the first quarter of the year was used as the support set, and the matching ability of the present systems and methods was tested on the second quarter dataset.

These two datasets were further separated between in-sample and out-of-sample families from the data. This is shown in FIG. 7 as testing dataset 740 representing an in-sample first quarter dataset; testing dataset 742 representing an in-sample second quarter dataset; testing dataset 750 representing an out-of-sample first quarter dataset; and testing dataset 752 representing an out-of-sample second quarter dataset.

The training dataset, training-2021, contained 175 families of malware. The in-sample testing datasets 740 and 742 contained samples from 25 families that were sampled from the 175 training families. The out-of-sample testing datasets 750 and 752, contained malware samples from 25 families that were not in training dataset 720.

This is further shown in Table 4, which shows the list of families, as well as a number of samples per family used in the in-sample testing datasets.

TABLE 4

| IN-SAMPLE FAMILY SETS<br>In-sample Families - Total (6278, 2955) | |
|---|---|
| agenttesla (3679, 1658) | snakekeylogger (1097, 600) |
| avemariarat (413, 227) | nanocore (314, 157) |
| njrat (312, 110) | gozi (86, 38) |
| coinminer (86, 18) | yellowcockatoo (39, 30) |
| coinminer.xmrig (37, 2) | tofsee (28, 12) |
| zeus (19, 7) | danabot (19, 15) |
| trickbot (18, 17) | urelas (17, 4) |
| a310logger (17, 12) | virlock (12, 11) |
| matanbuchus (8, 7) | runningrat (8, 3) |
| ircbot (7, 6) | cryptbot (7, 4) |
| sodinokibi (7, 7) | chaos (7, 3) |
| dridex (6, 3) | blackshades (6, 2) |
| kutaki (2, 2) | |

Table 5 shows the list of families, as well as a number of samples per family used in the out-of-sample testing datasets. As shown, there is no overlap in distinct malware samples between all of the discussed datasets.

TABLE 5

| OUT-OF-SAMPLE FAMILY SETS<br>Out-of-sample Families - Total (756, 504) | |
|---|---|
| smoke loader (310, 120) | resur (114, 114) |
| emotet (50, 50) | triusor (47, 47) |
| evora (36, 36) | emotet b (28, 28) |

TABLE 5-continued

| OUT-OF-SAMPLE FAMILY SETS<br>Out-of-sample Families - Total (756, 504) | |
|---|---|
| lockbit (19, 2) | parite (18, 18) |
| babdeda (17, 6) | blackguard (11, 2) |
| bitter (11, 11) | ursnif (11, 11) |
| vovabol (11, 11) | ketrican (9, 9) |
| dtrack (9, 9) | shifu (7, 4) |
| mydoom (6, 4) | qqpass (5, 5) |
| babuk (3, 3) | berbew (3, 3) |
| fathula (3, 3) | blister (2, 2) |
| vobfus (2, 2) | thanos (2, 2) |
| blackout (2, 2) | |

The present systems and methods (labelled as the "Present Model" in the tables below) was compared against eleven other methods for family matching. Three of the methods were the Malkov and Yashunin approximate nearest neighbor algorithm, with different input data. The input data tested with Malkov and Yashunin was raw malware byte string, L2 normalized malware byte string, and average pooled malware byte string. These are shown as "HNSW"; "L2+HNSW" and "Average Pooling+L2+HNSW" in the Tables below.

Five popular ML classifiers were also implemented to compare against the present model. The ML methods compared against the Mecha system were Quadratic Discriminant Analysis (QDA), as for example described in A. Tharwat, "Linear vs. quadratic discriminant analysis classifier: a tutorial," *Int. J. Appl. Pattern Recognit.*, vol. 3, no. 2, pp. 145-180, 2016; Ada Boost, as for example described in Y. Freund et al., "A decision-theoretic generalization of on-line learning and an application to boosting," *J. Comput. Syst. Sci.*, vol. 55, no. 1, pp. 119-139, 1997; Decision Tree, as for example described in L. Breiman et al., "Classification and Regression Trees", *Wadsworth,* 1984; Random Forest, as for example described in L. Breiman, "Random forests," *Mach. Learn.*, vol. 45, no. 1, pp. 5-32, 2001; and Gaussian Naive Bayes (NB), the contents of all of which are incorporated herein by reference. These methods were implemented to ensure the present model had a higher performance than conventional state-of-the-art ML-based classifiers.

The Siamese-based malware similarity networks proposed by Hsiao et al. and Conti et al. were implemented to compare classification ability in Siamese networks depending on input data, and output dimensional. These two networks have an input of two sample images and output a single similarity score. Due to this, the comparison between a single testing sample, and the entire support set required significantly more time than all other methods used in the experiments.

Finally, the embodiments of FIG. 4 and FIG. 6 (embedding+match) without the gym environment of FIG. 5, were compared with the full system comprising the embodiments of all of FIGS. 4, 5 and 6. This was done as an ablation test to determine the effect of the gym environment training on the classification ability of the present systems and methods.

All matching algorithms were given a 24-hour time limit for running, after which all results were predicted as 0. For comparing the different methods, the metric Area under the ROC curve (AUC), accuracy, precision, recall, and F1-Score were used. As well, all metrics were calculated with the optimal threshold determined by calculating the ROC curve.

As provided above, four experiments were performed. The first two experiments on the present model were used to validate the generalizability of the present systems and methods. A simulated real-world malware triage environment was performed using testing datasets 740 and 750 as stored data and the testing datasets 742 and 752 as new incoming samples. This experiment was performed twice, first with the in-sample data 740 and 742, and then with the out-of-sample data 750 and 752.

Along with verifying that the present systems and methods can reliably match unseen malware to the correct family, this experiment verified that the training process for the present systems and methods did not overfit the embedding network 430 to the training families. These experiments are referred to as in-sample generalizability and out-of-sample generalizability.

The second two experiments were used for validating the zero-day detection ability of the present systems and methods.

The third experiment was used to validate zero-day family detection as a binary classification problem. Given a sample, the present systems and methods were tasked with classifying the malware as either known or unknown.

The fourth experiment validated the zero-day family detection in a full malware triage simulation environment. Given an incoming sample, the present systems and methods were tasked with categorizing the sample into a known malware family or categorizing the sample as unknown. For these experiments, the testing dataset 740 was the simulated stored data, and both the in-sample testing dataset 742 and out-of-sample testing dataset 752 were the new incoming samples.

Results

The results for the two generalization experiments can be seen in Tables 6 and 7 below. Specifically, Table 6 shows the generalization experiment for in-sample data and Table 7 shows the generalization experiment for out-of-sample data.

TABLE 6

RESULTS OF MATCHING OF Q2 ON Q1 IN-SAMPLE DATA

| Baseline | AUC | Acc. | F1 | Precision | Recall | Optimal Threshold | Mean Embed. Dist. | Sample Infer. Time |
|---|---|---|---|---|---|---|---|---|
| QDA | 0.8412 | 0.8133 | 0.2719 | 0.1611 | 0.8714 | 0.0169 | ~ | 1.2825 |
| Ada Boost | 0.7681 | 0.9586 | 0.5199 | 0.4844 | 0.5611 | 0.1111 | ~ | 0.1087 |
| Decision tree | 0.7914 | 0.9619 | 0.5601 | 0.5206 | 0.6061 | 0.0011 | ~ | 0.0276 |
| Random Forest | 0.7714 | 0.9649 | 0.5611 | 0.5611 | 0.5611 | 1.0000 | ~ | 0.0327 |
| Gaussian NB | 0.6233 | 0.6205 | 0.1166 | 0.0643 | 0.6264 | 0.0017 | ~ | 0.0823 |

TABLE 6-continued

RESULTS OF MATCHING OF Q2 ON Q1 IN-SAMPLE DATA

| Baseline | AUC | Acc. | F1 | Precision | Recall | Optimal Threshold | Mean Embed. Dist. | Sample Infer. Time |
|---|---|---|---|---|---|---|---|---|
| HNSW | 0.9016 | 0.8362 | 0.3221 | 0.1930 | 0.9726 | 0.0225 | 4107985.532 | 0.5016 |
| L2 + HNSW | 0.9479 | 0.9246 | 0.5082 | 0.3439 | 0.9733 | 0.0737 | 0.2471 | 0.6679 |
| Average Pooling + L2 + HNSW | 0.9794 | 0.9741 | 0.7528 | 0.6091 | 0.9851 | 0.1116 | 0.0361 | 0.2078 |
| Hsiao et al | 0.5072 | 0.2051 | 0.2752 | 0.1609 | 0.9500 | 0.4981 | ~ | 10.4836 |
| Conti et al. | 0.5000 | 0.6255 | 0.0000 | 0.0000 | 0.0000 | 2.0000 | ~ | 13.0884 |
| Embedding + Match | 0.9529 | 0.9436 | 0.5773 | 0.4122 | 0.9631 | 0.1055 | 0.3375 | 0.5096 |
| Present Model | 0.9982 | 0.9984 | 0.9804 | 0.9634 | 0.998 | 0.3185 | 0.004 | 0.6150 |

As seen from Table 6, the Present model performed exceptionally well at classifying the trained malware samples, with an AUC of 0.9982 and accuracy of 0.9984. This shows the ability of the Present Model to accurately match malware variants to the correct family.

As well, it can be seen in Table 6 that the ablation test shows the performance enhancement from training in the generalization RL gym environment 500.

For F1, precision, and recall, the Present Model performed with the highest value in all three metrics. This further shows the balance of the Present Model when matching correct samples as well as indicating when two samples are not from the same family.

For sample inference time, the fastest model was the decision tree baseline with a sample inference time of 0.0276 seconds compared to a sample inference time of 0.6150 seconds for the Present Model. As well, it can be seen that the embeddings from the Present Model had a significantly lower mean embedding distance than other distance-based evaluation tools, further demonstrating the embedding power of the embedding network 430 and gym environment 500 training.

During the classification of each malware family by the Present Model on the in-sample data, the only families with a significant mismatch of samples were the "a310logger" family and the "coinminer" family.

For the out-of-sample data, the results are shown in Table 7.

TABLE 7

RESULTS OF MATCHING OF Q2 ON Q1 OUT-OF-SAMPLE DATA

| Baseline | AUC | Acc. | F1 | Precision | Recall | Optimal Threshold | Mean Embed. Dist. | Sample Infer. Time |
|---|---|---|---|---|---|---|---|---|
| QDA | 0.9894 | 0.9924 | 0.9119 | 0.8481 | 0.9861 | 0.2719 | ~ | 0.7909 |
| Ada Boost | 0.7136 | 0.8298 | 0.2163 | 0.1326 | 0.5873 | 0.0019 | ~ | 0.0423 |
| Decision tree | 0.6532 | 0.9329 | 0.2941 | 0.254 | 0.3492 | 0.0154 | ~ | 0.0100 |
| Random Forest | 0.6377 | 0.9415 | 0.2961 | 0.2855 | 0.3075 | 0.2127 | ~ | 0.1074 |
| Gaussian NB | 0.6262 | 0.5452 | 0.1116 | 0.0605 | 0.7143 | 0.0116 | ~ | 0.0397 |
| HNSW | 0.9748 | 0.9552 | 0.6403 | 0.4718 | 0.996 | 0.0667 | 4520590.163 | 0.1389 |
| L2 + HNSW | 0.9209 | 0.8829 | 0.3966 | 0.2497 | 0.9623 | 0.0222 | 0.3297 | 0.0431 |
| Average Pooling + L2 + HNSW | 0.9669 | 0.9638 | 0.6820 | 0.5258 | 0.9702 | 0.1760 | 0.0741 | 0.0197 |
| Hsiao et al | 0.5072 | 0.2051 | 0.2752 | 0.1609 | 0.9500 | 0.4981 | ~ | 10.4836 |
| Conti et al. | 0.5000 | 0.8412 | 0.0000 | 0.0000 | 0.0000 | 2.0000 | ~ | 1.8012 |
| Embedding + Match | 0.9520 | 0.9260 | 0.5146 | 0.3489 | 0.9802 | 0.0625 | 0.3538 | 0.0615 |
| Present Model | 0.9980 | 0.9962 | 0.9545 | 0.9130 | 1.0000 | 0.3485 | 0.0073 | 0.0822 |

As seen from Table 7, the Present Model had the best performance with an AUC of 0.9980 and accuracy of 0.9962. Unlike the in-sample experiments, the embedding and match baseline was not the second best model. In the out-of-sample experiment, the second best model was QDA with an AUC of 0.9894 and accuracy of 0.9924. As for F1, precision, and recall the Present Model outperformed QDA with a significantly higher precision.

Similar to the in-sample test, the Present Model had the shortest mean embedding distance. However, the Present Model did not have the lowest sample inference time. Although the Present Model system is not the fastest of the baselines, the per sample inference time is not significantly higher and does produce more accurate results.

The classification results on the out-of-sample data resulted in only the "MyDoom" family being significantly misclassified with a classification accuracy of 0.75.

Table 8 shows the results for the zero-day detection as a binary classification problem experiment. Given a support set of malware samples, the models were tasked predicting if incoming samples were from known or unknown families in the in-sample and out-of-sample testing datasets. If the incoming samples was outside of a given threshold ($\tau$) to its closest neighbor, it was predicted as unknown.

TABLE 8

RESULTS OF ZERO-DAY PREDICTION

| Baseline | AUC | Acc. | F1 | Precision | Recall | Optimal Threshold | Mean Embed. Dist. | Sample Infer. Time |
|---|---|---|---|---|---|---|---|---|
| QDA | 0.5000 | 0.8543 | 0.0000 | 0.0000 | 0.0000 | 1.0000 | ~ | 1.2087 |
| Ada Boost | 0.5000 | 0.8543 | 0.0000 | 0.0000 | 0.0000 | 1.0000 | ~ | 0.0806 |
| Decision tree | 0.5000 | 0.8543 | 0.0000 | 0.0000 | 0.0000 | 1.0000 | ~ | 0.0231 |
| Random Forest | 0.5000 | 0.8543 | 0.0000 | 0.0000 | 0.0000 | 1.0000 | ~ | 0.0309 |
| Gaussian NB | 0.5000 | 0.8543 | 0.0000 | 0.0000 | 0.0000 | 1.0000 | ~ | 0.0721 |
| HNSW | 0.5000 | 0.8543 | 0.0000 | 0.0000 | 0.0000 | 1.0000 | 4265060.999 | 0.4478 |
| L2 + HNSW | 0.5000 | 0.8543 | 0.0000 | 0.0000 | 0.0000 | 1.0000 | 0.2619 | 0.4382 |
| Average Pooling + L2 + HNSW | 0.5000 | 0.8543 | 0.0000 | 0.0000 | 0.0000 | 1.0000 | 0.0509 | 0.1834 |
| Hsiao et al | 0.5000 | 0.0000 | 0.0000 | 0.0000 | 0.0000 | 1.0000 | ~ | 1.4371 |
| Conti et al. | 0.5000 | 0.0000 | 0.0000 | 0.0000 | 0.0000 | 1.0000 | ~ | 1.8335 |
| Embedding + Match | 0.6890 | 0.8103 | 0.4431 | 0.3872 | 0.5179 | 0.9548 | 0.3627 | 0.4534 |
| Present Model | 0.9962 | 0.9977 | 0.9921 | 0.9901 | 0.9940 | 0.3915 | 0.0064 | 0.5031 |

As can be seen in Table 8, the Present Model outperformed all baselines significantly in this experiment. As well, the Present Model had an AUC of 0.9962 and an accuracy of 0.9977, making the model very accurate at detecting if an incoming sample is known to the system or not. Also, the F1, precision and recall are all almost 1 with the lowest of the three being precision with a score of 0.9901.

Similar to previous experiments, the sample inference time was half a second on average.

Table 9 shows the results of the zero-day family classification experiment.

TABLE 9

RESULTS OF FAMILY CLASSIFICATION WITH ZERO-DAY SAMPLES

| Baseline | AUC | Acc. | F1 | Precision | Recall | Optimal Threshold | Mean Embed. Dist. | Sample Infer. Time |
|---|---|---|---|---|---|---|---|---|
| QDA | 0.8332 | 0.7977 | 0.2274 | 0.1308 | 0.8714 | 0.0169 | ~ | 1.2087 |
| Ada Boost | 0.7659 | 0.9566 | 0.4692 | 0.4032 | 0.5611 | 0.1111 | ~ | 0.0806 |
| Decision tree | 0.7895 | 0.9603 | 0.5105 | 0.4410 | 0.6061 | 0.0011 | ~ | 0.0231 |
| Random Forest | 0.7698 | 0.9642 | 0.5170 | 0.4793 | 0.5611 | 1.0000 | ~ | 0.0309 |
| Gaussian NB | 0.6114 | 0.5684 | 0.0943 | 0.0508 | 0.6575 | 0.0013 | ~ | 0.0721 |
| HNSW | 0.8990 | 0.8383 | 0.2895 | 0.1703 | 0.9641 | 0.0251 | 4265060.999 | 0.4478 |
| L2 + HNSW | 0.9379 | 0.8973 | 0.3952 | 0.2474 | 0.9814 | 0.0588 | 0.2619 | 0.4382 |
| Average Pooling + L2 + HNSW | 0.9719 | 0.9637 | 0.6485 | 0.4845 | 0.9807 | 0.1060 | 0.0509 | 0.1834 |
| Hsiao et al | 0.5000 | 0.6801 | 0.0000 | 0.0000 | 0.0000 | 2.0000 | ~ | 1.4371 |
| Conti et al. | 0.5000 | 0.9769 | 0.0000 | 0.0000 | 0.0000 | 2.0000 | ~ | 1.8335 |
| Embedding + Match | 0.9669 | 0.9423 | 0.5699 | 0.3995 | 0.9936 | 0.0051 | 0.3627 | 0.4534 |
| Present Model | 0.9978 | 0.9979 | 0.9739 | 0.9512 | 0.9977 | 0.3056 | 0.0064 | 0.5031 |

Similar to all previous experiments, Table 9 shows that the Present Model has the best performance with an AUC of 0.9978 and accuracy of 0.9979. As well, the F1 precision, and recall, were all above 0.95, with the lowest metric being precision with a score of 0.9512.

The model that performed the second best was the Average Pooling+L2+HNSW model with an AUC of 0.9719 and accuracy of 0.9637. This is a better result than the ablation embedding network+match, but still not as accurate as the Present Model.

Table 9 shows a large difference in performance between most of the models in the binary classification and the family classification experiment. For the family classification, many models previously showed an ability to classify known families, which causes high success in the zero-day family classification experiment. It shows in the binary classification experiment that almost all of the models have little to no ability to detect if a sample is known or unknown to the model.

For the classification of the families in the zero-day experiment, almost all of the unknown samples (0.9780) were correctly classified as unknown. The other unknown samples were classified as the Danabot family.

For further evaluation on the ablation study between embedding and match when compared to the entire system and method, the ROC curves for the two models in the four experiments can be seen in FIGS. 8, 9, 10 and 11.

Figure 8:
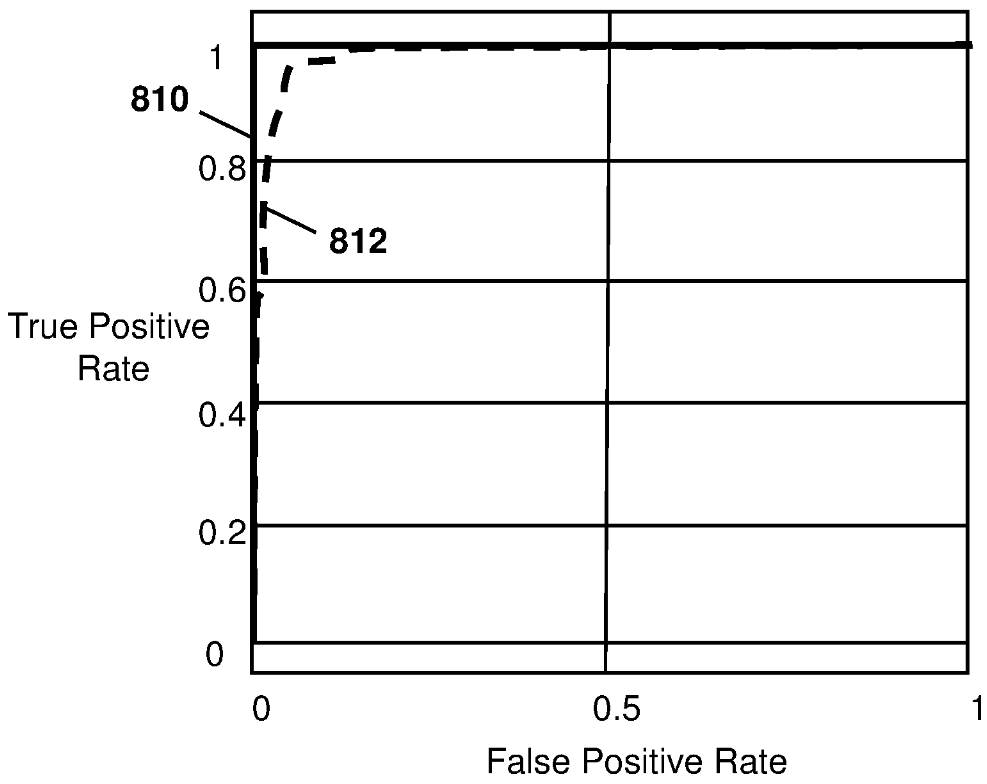
FIG. 8 is a plot of Receiver Operating Characteristic (ROC) curves for an in-sample classification comparing the present embodiments with an ablation study.

Specifically, FIG. 8 shows the ROC curves for in-sample classification. The present model combining the embodiments of FIGS. 4, 5 and 6 is denoted by line 810 and the embedding and match model is denoted by line 812. The optimal ROC curve would have an area of 1.0 under it.

Figure 9:
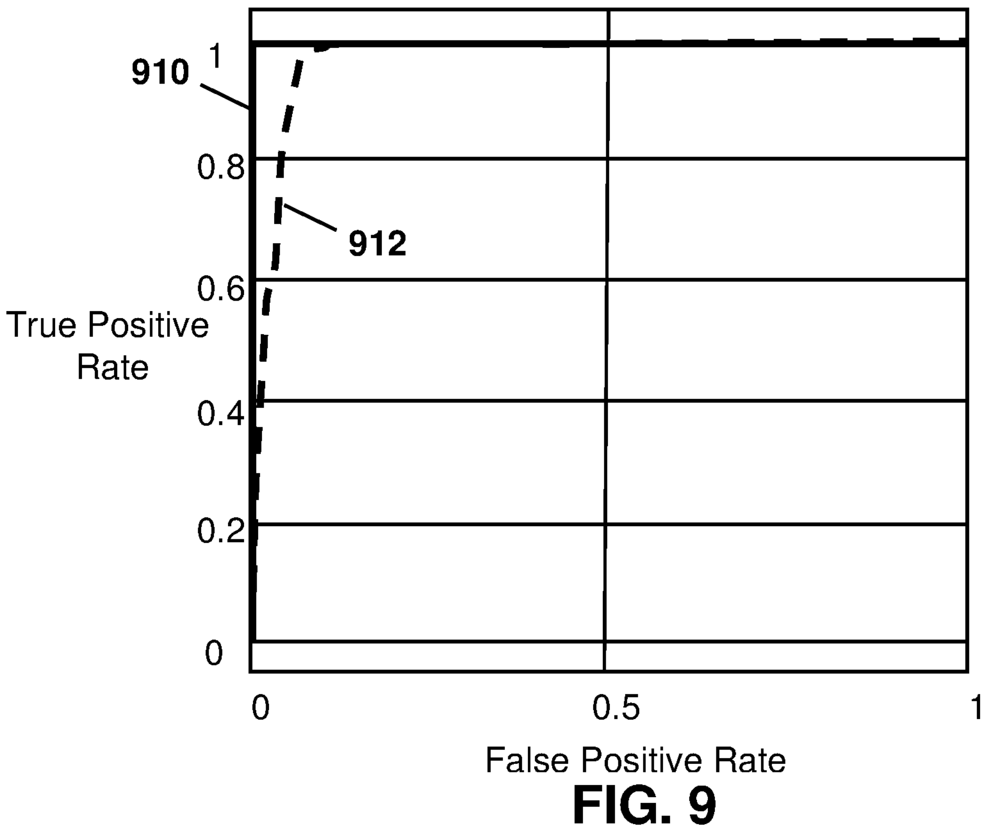
FIG. 9 is a plot of ROC curves for an out-of-sample classification comparing the present embodiments with an ablation study.

FIG. 9 shows the ROC curves for out-of-sample classification. The present model combining the embodiments of FIGS. 4, 5 and 6 is denoted by line 910 and the embedding and match model is denoted by line 912. Again, the optimal ROC curve would have an area of 1.0 under it.

Figure 10:
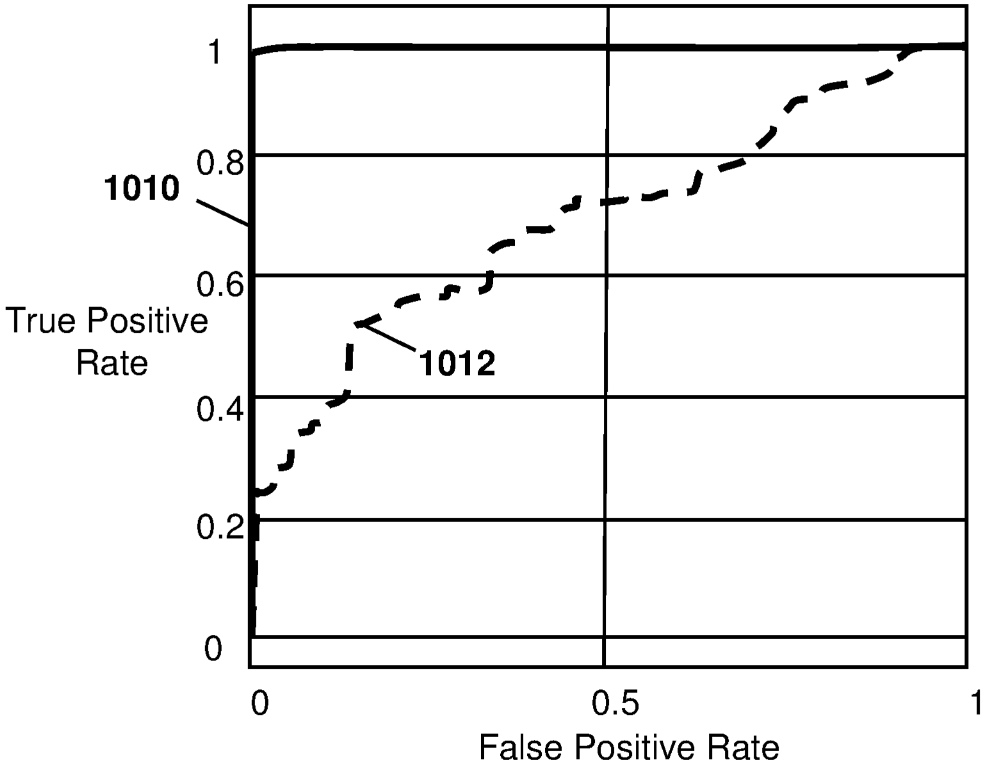
FIG. 10 is a plot of ROC curves for a zero-day binary classification comparing the present embodiments with an ablation study.

FIG. 10 shows the ROC curves for zero-day binary classification. The present model combining the embodiments of FIGS. 4, 5 and 6 is denoted by line 1010 and the embedding and match model is denoted by line 1012. Again, the optimal ROC curve would have an area of 1.0 under it.

Figure 11:
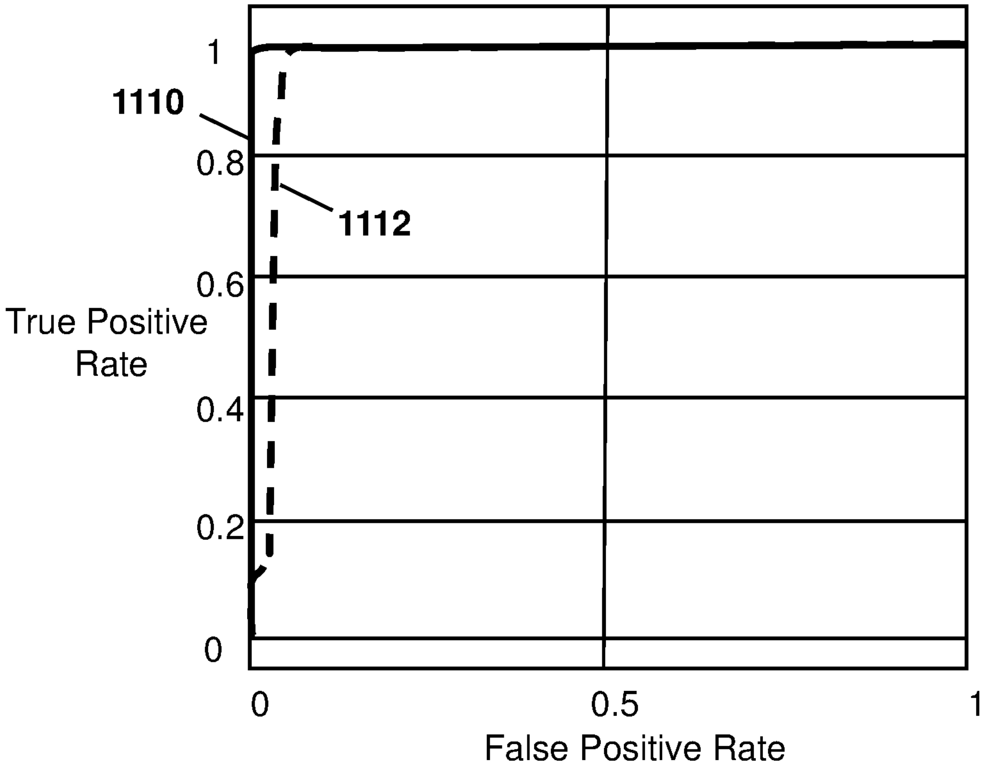
FIG. 11 is a plot of ROC curves for a zero-day family classification comparing the present embodiments with an ablation study.

FIG. 11 shows the ROC curves for zero-day family classification. The present model combining the embodiments of FIGS. 4, 5 and 6 is denoted by line 1110 and the embedding and match model is denoted by line 1112. Again, the optimal ROC curve would have an area of 1.0 under it.

As can be seen from the graphs, the present model system is much closer to an ideal curve than the ablation model of embedding+match. This further validates the aid in model training the reinforcement learning environment provides to the present systems and methods.

Computing Device

The above methods may be implemented using any computing device or group of computing devices. One simplified diagram of a computing device is shown with regard to FIG. 12.

Figure 12:
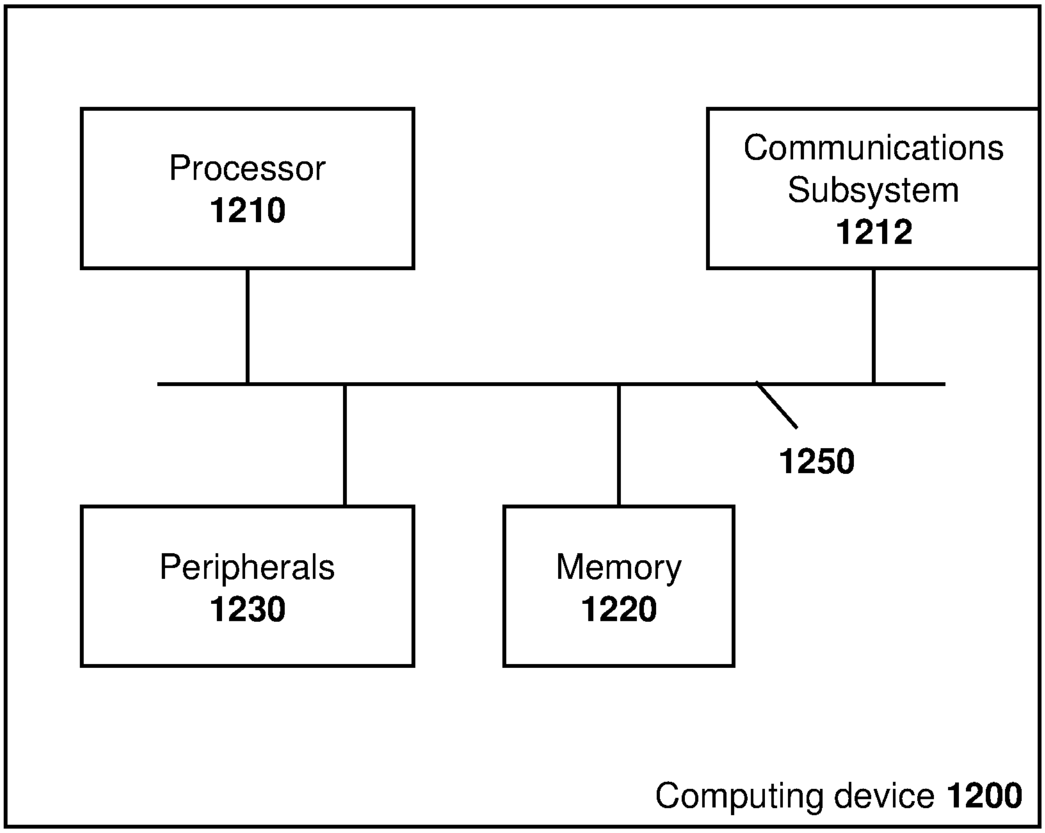
FIG. 12 is a block diagram of a simplified computing device capable of being used with the embodiments of the present disclosure.

In FIG. 12, device 1200 includes a processor 1210 and a communications subsystem 1212, where the processor 1210 and communications subsystem 1212 cooperate to perform the methods of the embodiments described above. Communications subsystem 1212 may, in some embodiments, comprise multiple subsystems, for example for different radio technologies.

Processor 1210 is configured to execute programmable logic, which may be stored, along with data, on device 1200, and shown in the example of FIG. 12 as memory 1220. Memory 1220 can be any tangible, non-transitory computer readable storage medium which stores instruction code that, when executed by processor 1210 cause device 1200 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1220, device 1200 may access data or programmable logic from an external storage medium, for example through communications subsystem 1212.

Communications subsystem 1212 allows device 1200 to communicate with other devices or network elements and may vary based on the type of communication being performed. Further, communications subsystem 1212 may comprise a plurality of communications technologies, including any wired or wireless communications technology.

In some cases, device 1200 may include peripherals 1230, which may, for example, include input and output devices such as monitors, keyboards, keypads, track balls, mice, cameras, speakers, among others. Peripherals are however optional, and in some cases the computing device may simply provide processing and communicate the results of the processing.

Communications between the various elements of device 1200 may be through an internal bus 1250 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device comprising:

performing a first training on the embedding network, the first training comprising:

randomly choosing two malware samples from a malware family;

randomly choosing a benignware sample from a corpus of benignware;

fragmenting each of the two malware samples and the benignware sample into byte strings of the predetermined length:

creating triplet pairs of an anchor sample and positive sample from the byte strings from the two malware samples and a negative sample from the byte strings from the benignware sample; and training the embedding network for triplet loss based on the triplet pairs;

fragmenting a malware sample into a plurality of byte strings, each of the plurality of byte strings having a predetermined length, the predetermined length being based on an input size of an embedding network trained on triplet pairs derived from malware and benignware to ensure a differentiation in byte string functionality;

embedding each of the plurality of byte strings in the embedding network to generate a plurality of embeddings;

for each embedding in the plurality of embeddings, finding a nearest neighbor; and setting a predicted family for the malware sample based on a fusion of the nearest neighbor for each of the plurality of embeddings;

wherein when the nearest neighbor for an embedding is outside a predetermined threshold, classifying the embedding as unknown; and wherein, when the fusion comprises an unknown family, flagging the malware sample as a zero-day sample, the flagging causing an action to be performed on the malware sample.

2. The method of claim 1, wherein the two malware samples and the benignware sample are raw executables.

3. The method of claim 1, wherein triplet loss is calculated based on $$L = \sum_{i=1}^{b}\left[\|f(x_i^a) - f(x_i^p)\|_2^2 - \|f(x_i^a) - f(x_i^n)\|_2^2 + \alpha\right]_+$$

where, Lis the loss, $x^a$ is the anchor sample, $x^p$ is the positive sample, $x^n$ is the negative sample, b is the length of a batch of triplet pairs, and a is a margin enforced between positive and negative pairs.

4. The method of claim 1, further comprising using a gym environment to perform a second training, the second training comprising:

creating a training set by:

randomly choosing a plurality of first malware samples from a corpus of malware samples;

fragmenting each of the plurality of first malware samples into a plurality of training byte strings, each of the plurality of training byte strings having a predetermined length; and organizing the plurality of training byte strings into the training set;

creating a support set by:

randomly choosing a plurality of second malware samples from a corpus of malware samples;

fragmenting each of the plurality of second malware samples into a plurality of support byte strings, each of the plurality of support byte strings having a predetermined length; and organizing the plurality of support byte strings into the support set;

choosing a batch of the training set; and using the support set and batch of the training set to update the embedding network by establishing a reward for batch matching for the entire batch of the training set.

5. The method of claim 4, wherein the support set and batch of the training set are embedded using the embedding network.

6. The method of claim 5, wherein the establishing the reward comprises performing a batch neighbor search for the batch of the training set.

7. The method of claim 6, wherein the establishing the reward further comprising repeating batch neighbor search over the entire training set.

8. A computing device comprising:

a processor; and memory, wherein the computing device is configured to:

perform a first training on the embedding network, the first training comprising:

randomly choosing two malware samples from a malware family;

randomly choosing a benignware sample from a corpus of benignware;

fragmenting each of the two malware samples and the benignware sample into byte strings of the predetermined length;

creating triplet pairs of an anchor sample and positive sample from the byte strings from the two malware samples and a negative sample from the byte strings from the benignware sample; and training the embedding network for triplet loss based on the triplet pairs;

fragment a malware sample into a plurality of byte strings, each of the plurality of byte strings having a predetermined length, the predetermined length being based on an input size of an embedding network trained on triplet pairs derived from malware and benignware to ensure a differentiation in byte string functionality;

embed each of the plurality of byte strings in the embedding network to generate a plurality of embeddings;

for each embedding in the plurality of embeddings, find a nearest neighbor; and set a predicted family for the malware sample based on a fusion of the nearest neighbor for each of the plurality of embeddings;

wherein when the nearest neighbor for an embedding is outside a predetermined threshold, classifying the embedding as unknown; and wherein, when the fusion comprises an unknown family, flagging the malware sample as a zero-day sample, the flagging causing an action to be performed on the malware sample.

9. The computing device of claim 8, wherein the two malware samples and the benignware sample are all raw executables.

10. The computing device of claim 8, wherein triplet loss is calculated based on $$L = \sum_{i=1}^{b}\left[\|f(x_i^a) - f(x_i^p)\|_2^2 - \|f(x_i^a) - f(x_i^n)\|_2^2 + \alpha\right]_+$$

where, L is the loss, $x^a$ is the anchor sample, $x^p$ is the positive sample, $x^n$ is the negative sample, b is the length of a batch of triplet pairs, and a is a margin enforced between positive and negative pairs.

11. The computing device of claim 8, wherein the computing device is further configured to use a gym environment to perform a second training, the second training comprising:

creating a training set by:

randomly choosing a plurality of first malware samples from a corpus of malware samples;

fragmenting each of the plurality of first malware samples into a plurality of training byte strings, each of the plurality of training byte strings having a predetermined length; and organizing the plurality of training byte strings into the training set;

creating a support set by:

randomly choosing a plurality of second malware samples from a corpus of malware samples;

fragmenting each of the plurality of second malware samples into a plurality of support byte strings, each of the plurality of support byte strings having a predetermined length; and organizing the plurality of support byte strings into the support set;

choosing a batch of the training set; and using the support set and batch of the training set to update the embedding network by establishing a reward for batch matching for the entire batch of the training set.

12. The computing device of claim 11, wherein the support set and batch of the training set are embedded using the embedding network.

13. The computing device of claim 12, wherein the computing device is configured to establish the reward by performing a batch neighbor search for the batch of the training set.

14. The computing device of claim 13, wherein the computing device is configured to establish the reward by further repeating batch neighbor search over the entire training set.

15. A non-transitory computer readable medium for storing instruction code, which, when executed by a processor of a computing device, cause the computing device to:

perform a first training on the embedding network, the first training comprising:

randomly choosing two malware samples from a malware family;

randomly choosing a benignware sample from a corpus of benignware;

fragmenting each of the two malware samples and the benignware sample into byte strings of the predetermined length;

creating triplet pairs of an anchor sample and positive sample from the byte strings from the two malware samples and a negative sample from the byte strings from the benignware sample; and training the embedding network for triplet loss based on the triplet pairs;

fragment a malware sample into a plurality of byte strings, each of the plurality of byte strings having a predetermined length, the predetermined length being based on an input size of an embedding network trained on triplet pairs derived from malware and benignware to ensure a differentiation in byte string functionality;

embed each of the plurality of byte strings in the embedding network to generate a plurality of embeddings;

for each embedding in the plurality of embeddings, find a nearest neighbor; and set a predicted family for the malware sample based on a fusion of the nearest neighbor for each of the plurality of embeddings;

wherein when the nearest neighbor for an embedding is outside a predetermined threshold, classifying the embedding as unknown; and wherein, when the fusion comprises an unknown family, flagging the malware sample as a zero-day sample, the flagging causing an action to be performed on the malware sample.

* * * * *